United States Patent
Xu et al.

(10) Patent No.: US 12,307,109 B2
(45) Date of Patent: May 20, 2025

(54) JOURNAL BASED DATA STORAGE IN BLOCK-LEVEL STORAGE

(71) Applicants: Lemon Inc., Grand Cayman (KY); Beijing Volcano Engine Technology Co., Ltd., Beijing (CN)

(72) Inventors: Peng Xu, Los Angeles, CA (US); Fei Liu, Los Angeles, CA (US); Sheng Qiu, Los Angeles, CA (US); Kyoungryun Bae, Los Angeles, CA (US); Ming Lin, Los Angeles, CA (US); Jinwei Xie, Beijing (CN); Shan Xiao, Beijing (CN); Bhanu Gogineni, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/476,685

(22) Filed: Sep. 28, 2023

(65) Prior Publication Data
US 2025/0110652 A1    Apr. 3, 2025

(51) Int. Cl.
G06F 3/06    (2006.01)

(52) U.S. Cl.
CPC ............ G06F 3/064 (2013.01); G06F 3/0604 (2013.01); G06F 3/0679 (2013.01)

(58) Field of Classification Search
CPC ....... G06F 3/0604; G06F 3/064; G06F 3/0679
See application file for complete search history.

(56) References Cited

U.S. PATENT DOCUMENTS

| | | | |
|---|---|---|---|
| 10,417,190 B1 * | 9/2019 | Donlan | G06F 16/128 |
| 2008/0222214 A1 * | 9/2008 | Tokuda | G06F 11/1076 |
| 2014/0379715 A1 * | 12/2014 | Kesselman | G06F 3/067 |
| | | | 707/737 |
| 2017/0242583 A1 | 8/2017 | Yang et al. | |
| 2022/0300163 A1 * | 9/2022 | Jose | G06F 3/0679 |

OTHER PUBLICATIONS

Extended European Search Report for European Application No. 24193728.3, mailed Jan. 31, 2025, 8 pages.
Jung S., et al., "Hierarchical Architecture of Flash-based Storage Systems for High Performance and Durability," Design Automation Conference, 2009, DAC 09, 46th ACM/IEEE, Jul. 26, 2009, pp. 907-910.
Jung S., et al., "Hierarchical Use of Heterogeneous Flash Memories for Hign Performance and Durability," IEEE Transactions on Consumer Electronics, 2009, vol. 55, No. 3, pp. 1383-391.

* cited by examiner

*Primary Examiner* — Larry T Mackall
(74) *Attorney, Agent, or Firm* — Fish & Richardson P.C.

(57) ABSTRACT

A method is directed to storing data in a non-volatile storage. The method includes writing sequentially at least a main portion of a data record in one or more logic blocks of an append-only storage zone of the non-volatile storage until the one or more first logic blocks are written full. The method also includes generating a first journal including a remainder portion of the first data record and a first journal entry for the remainder portion. A storage device control system includes a non-volatile storage and a controller for the non-volatile storage.

19 Claims, 8 Drawing Sheets

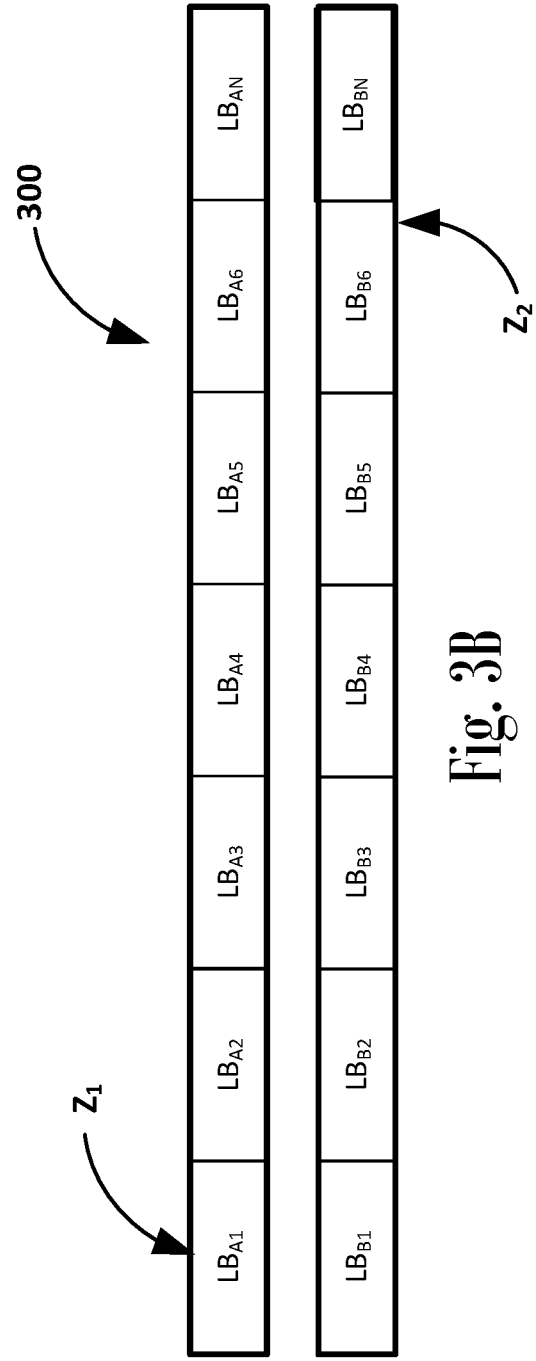

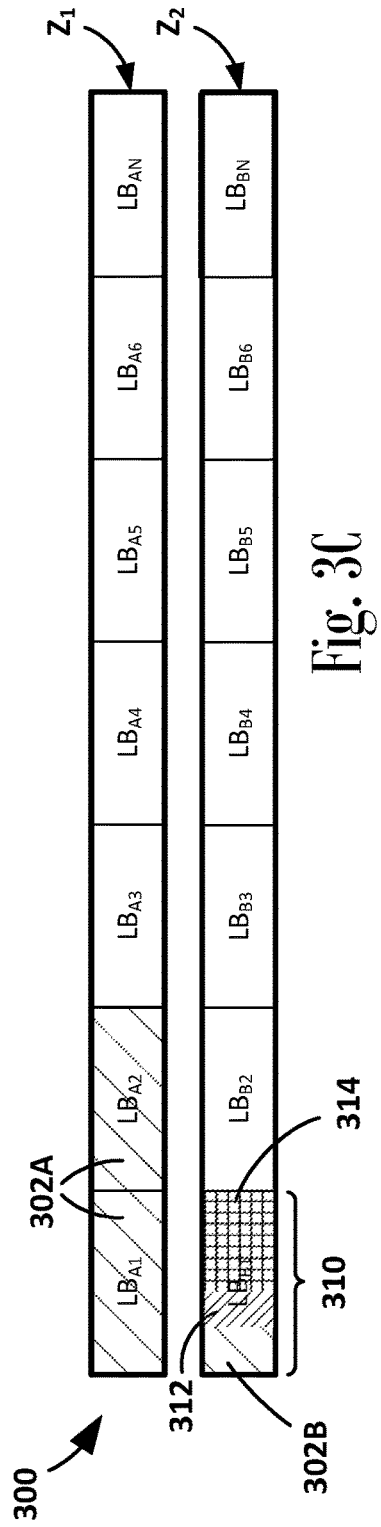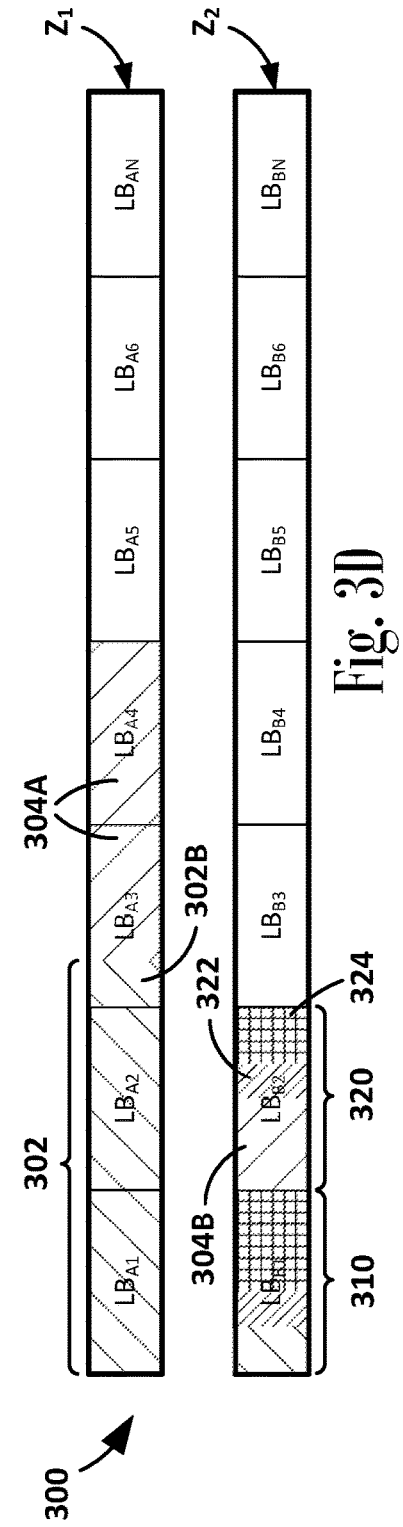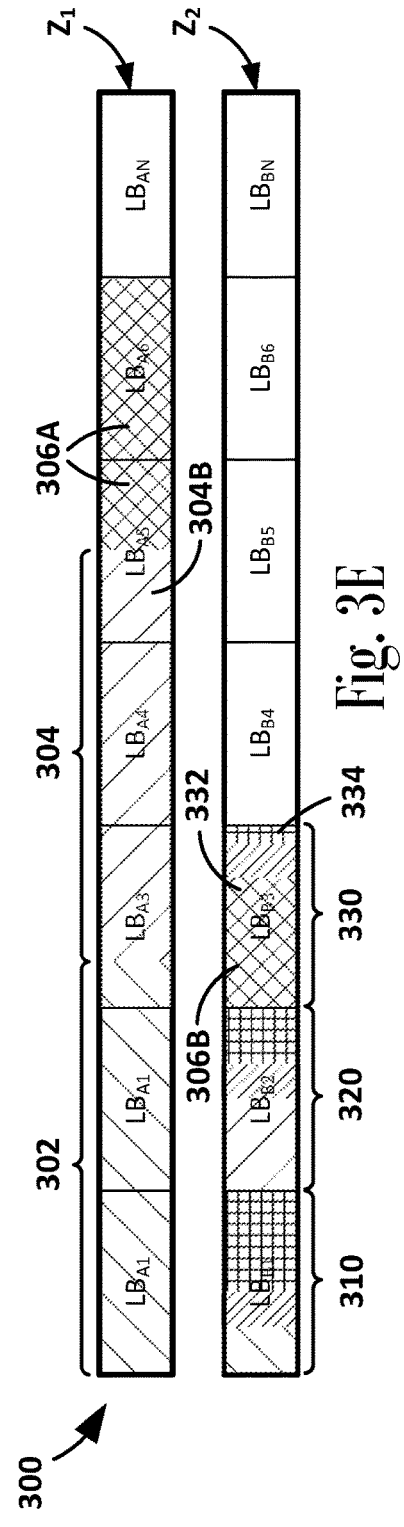

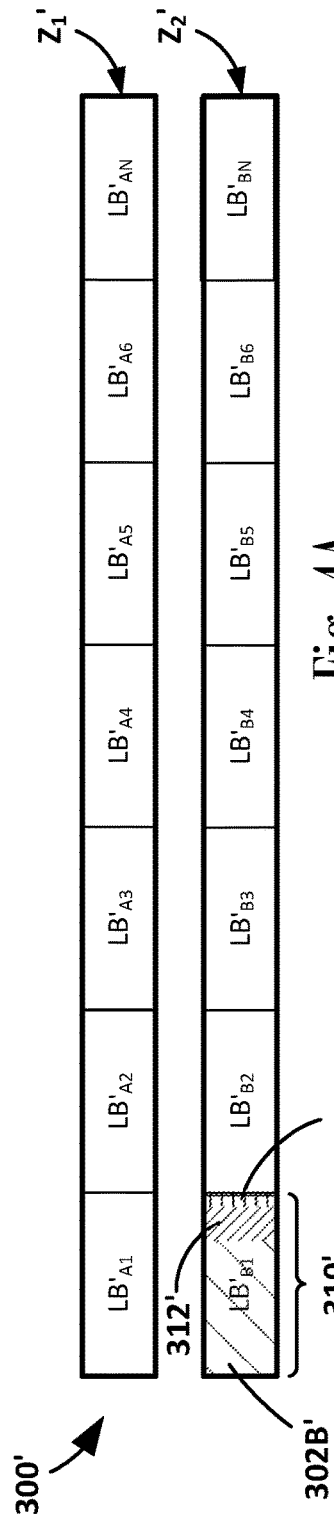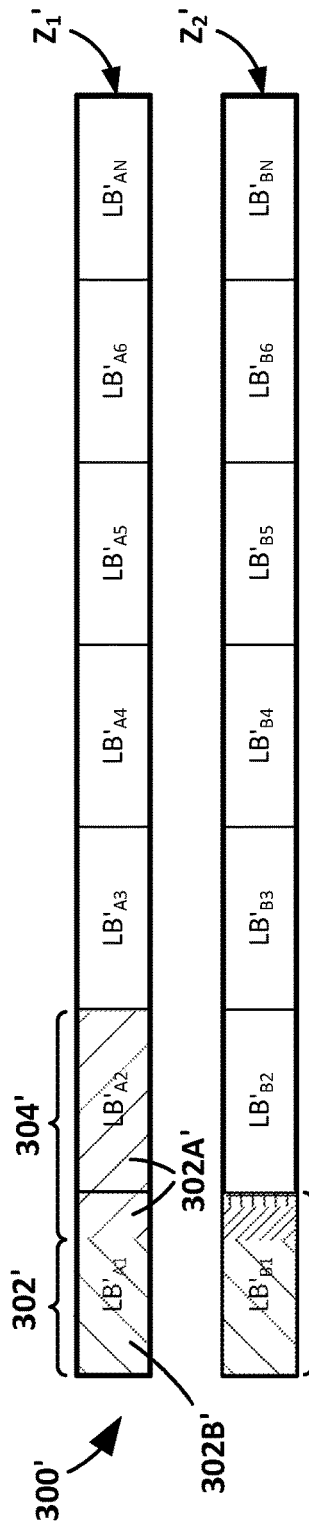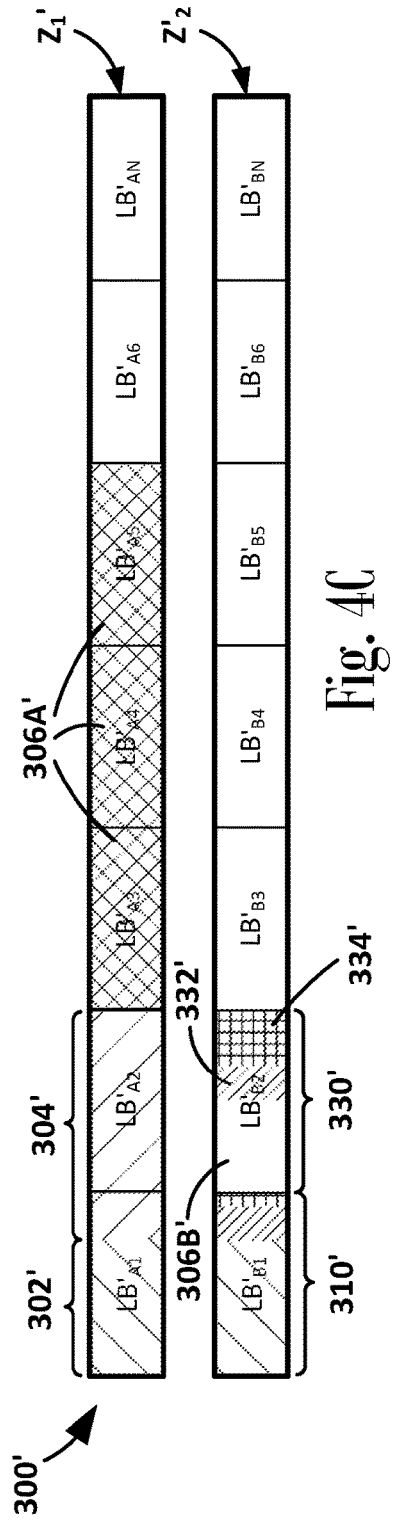

JOURNAL BASED DATA STORAGE IN BLOCK-LEVEL STORAGE

FIELD

This disclosure relates to block-level storage. More particularly, this disclosure relates to block storage in non-volatile storage.

BACKGROUND

Block storage, or referred to as block-level storage, is a common form of storage that is used to store data in blocks e.g., on storage area networks, in cloud-based storage environments, etc. Each block may be stored as a separate piece with a unique identifier. Cloud-based block storage or storage device is a common product offered by cloud service providers (CSPs). Block-level storage may be employed to store data on a storage device, e.g., a hard disk drive (HDD), a solid-state drive (SSD), etc. For example, Conventional magnetic recording (CMR) is an example of a manner of storing data on a storage device (e.g., on a HDD) that generally has no data overwrite restrictions. Shingled magnetic recording (SMR) is another example of a manner of storing data on a storage device (e.g., on a HDD) in which data is stored on a zone basis, and each zone is append-only media.

SUMMARY

In an embodiment, a method is directed to storing data in a non-volatile storage. The method comprises writing sequentially at least a main portion of a first data record in one or more first logic blocks of a first append-only storage zone of the non-volatile storage until the one or more first logic blocks are written full, and generating a first journal including a remainder portion of the first data record and a journal entry for the remainder portion.

In an embodiment, a storage device control system comprises a non-volatile storage and a controller. The controller is configured to write sequentially at least a main portion of a first data record in one or more sequential first logic blocks of a first append-only storage zone of the non-volatile storage until the one or more sequential first logic blocks are written full, and generate a first journal including a remainder portion of the first data record and a journal entry for the remainder portion.

In an embodiment, a non-transitory computer-readable medium having computer-executable instructions stored thereon that, upon execution, cause one or more processors to perform operations. The operations comprising writing sequentially at least a main portion of a first data record in one or more first logic blocks of a first append-only storage zone of a non-volatile storage until the one or more first logic blocks are written full, and generating a first journal including a remainder portion of the first data record and a journal entry for the remainder portion.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 3A is a schematic view of an embodiment of storage zones in block level storage space.

FIG. 3B is a schematic view of a first storage zone and a second storage zone of the block level storage space in FIG. 3A, according to an embodiment.

FIG. 3C is a schematic view of the first and second storage zones in the block level storage space of FIG. 3B after storing a first data record, according to an embodiment.

FIG. 3D is a schematic view of the first and second zones in the block level storage space of FIG. 3B after storing a second data record, according to an embodiment.

FIG. 3E is a schematic view of the first and second zones in the block level storage space of FIG. 3B after storing a third data record, according to an embodiment.

FIG. 4A is a schematic view of an embodiment of a first zone and a second zone in a block level storage space after a storing first data record.

FIG. 4B is a schematic view of the first and second zones in the block level storage space of FIG. 4A after storing a second data record.

FIG. 4C is a schematic view of the first and second zones in the block level storage space of FIG. 4A after storing a third data record.

Like numbers represent like features.

DETAILED DESCRIPTION

Figure 1:
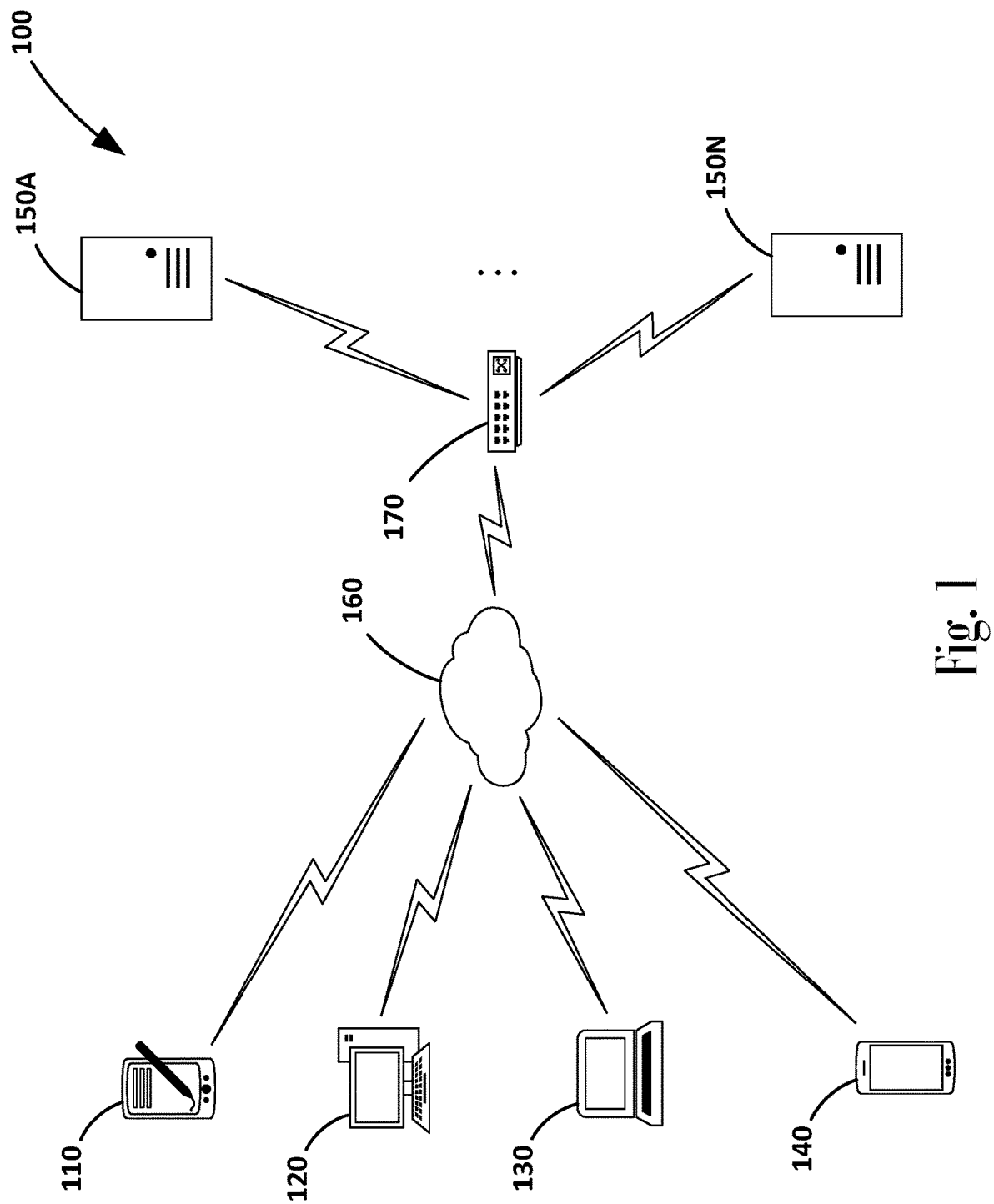
FIG. 1 is a schematic view of an example cloud-based block storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "block" or "logic block" in data storage may refer to a fixed-size amount of storage within a storage medium that is capable of storing a piece of data. It is to be understood that data may be stored in blocks, and each block may be assigned a unique address or identifier. In an example embodiment, the size of each block may be 4 KB.

As referenced herein, "padding" in data storage may refer to added non-informational bits added to data (e.g., onto the end of data) resulting in the data being a desired size. The "padding" is provided so that data is written in alignment with a logic block size.

As referenced herein, "aligned write" and "logic block aligned" in data storage refers to writing data to one or more logic block(s) that exactly fills the one or more logic blocks. For example, for a logic block size of 4 KB, writing to logic blocks in increments of 4 KB (e.g., 4 KB, 8 KB, 12 KB, etc.), such that all blocks written to are written full.

As referenced herein, "append-only" in data storage may refer to storage zone in which written data cannot be overwritten, unless the entire storage zone is reset.

As referenced herein, "metadata" may refer to data that provides information about other data, but not the content of the data. It is to be understood that metadata may be referred to as "data about data" (i.e., data providing information about one or more aspects of other data). In some example embodiments, metadata may include time and date of creation, size of the data, source of the data, usage of data, linkage between two pieces of data, etc.

As referenced herein, "remainder" or "remainder portion" refers to a portion of a data record that is not written to a data storage zone, and may be the entirety of the data record. For example, a remainder of a data record may be less than the entirety of the data record or the entire data record depending on a size of the data record and a logic block size.

FIG. 1 is a schematic view of an example cloud-based block storage system 100, arranged in accordance with at least some embodiments described herein.

The system 100 may include terminal devices 110, 120, 130, and 140, a network 160, a host controller 170 (e.g., a host device), and one or more servers 150A-150N. It is to be understood that FIG. 1 only shows illustrative numbers of terminal devices, network, host controller, and servers. The embodiments described herein are not limited to the number of the terminal devices, the network, the host device, and/or the servers described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not limited to a mobile device such as a smartphone, a tablet computer, an e-book reader, a laptop computer, a desktop computer, and/or any other suitable electronic devices.

In accordance with at least some example embodiments, the network 160 may be a medium used (e.g., designed, programmed, or otherwise programed) to provide a communications link between the terminal devices 110, 120, 130, 140 and the server 150. The network 160 may be the Internet, a local area network (LAN), a wide area network (WAN), a local interconnect network (LIN), a cloud network, etc. The network 160 may be implemented by various types of connections, such as a wired communications link, a wireless communications link, an optical fiber cable, etc.

In accordance with at least some example embodiments described and recited herein, the host controller 170 is designed, programmed, or otherwise configured to link servers 150A-150N together, e.g., in a data center or to link other host controllers, e.g., in other data centers. Further, host controller 170 is designed, programmed, or otherwise configured to send and/or receive applications, services, data, etc., to one or more of connected terminal devices 110, 120, 130, 140.

In accordance with at least some example embodiments, one or more servers 150A-150N are designed, programmed, or otherwise configured to provide various services, e.g., cloud storage and/or computing services to end users that are using one or more of the terminal devices 110, 120, 130, 140. The servers 150A-150N may be implemented as a data center that includes a distributed server cluster including one or more of servers 150A-150N. In some embodiments, one or more data centers may be in communication with each other over network 160. One or more of servers 150A-150N may also include a controller to control hardware and/or storing software and firmware and providing the functionalities of the one or more of servers 150A-150N. Hereafter, unless context requires otherwise, reference will be made to "server 150," which is to convey implementation of one or more of servers 150A-150N.

In some embodiments, server 150 may correspond physically or communicatively with one or more storage devices, e.g., non-volatile hard disk drives (HDDs) (e.g., magnetic disk drive), non-volatile memory (NVM) solid state drives (SSDs) (e.g., flash memory), using various communication interfaces that allow for robust data storage and/or retrieval on/from one or more such storage devices. In some embodiments, the server 150 may correspond physically or communicatively with one or more HDDs using communication protocols that allow for robust data storage and/or retrieval on the non-volatile magnetic disk drives thereof.

An end user may use one or more of terminal devices 110, 120, 130, and 140 to interact with the server 150 via the network 160. Various applications, such as social media applications or the like, may be installed on the terminal devices 110, 120, 130, and 140. In some embodiments, the end user may request big data analytics or data mining on data on the storage devices connected to server 150 for supporting learning models or the like. In some embodiments, the end user may transmit data to be stored on the storage device(s) connected to server 150.

It is to be understood that software applications or services according to the embodiments described herein and/or according to the services provided by cloud service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that in a case that a service is not performed remotely, the system 100 may not include the network 160, but include only the terminal device 110, 120, 130, and 140 and/or the server 150. Further, in accordance with some example embodiments described herein, when a service is not performed remotely, system 100 might not include network 160, but include terminal device 110, 120, 130, and 140, host controller 170, and/or server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
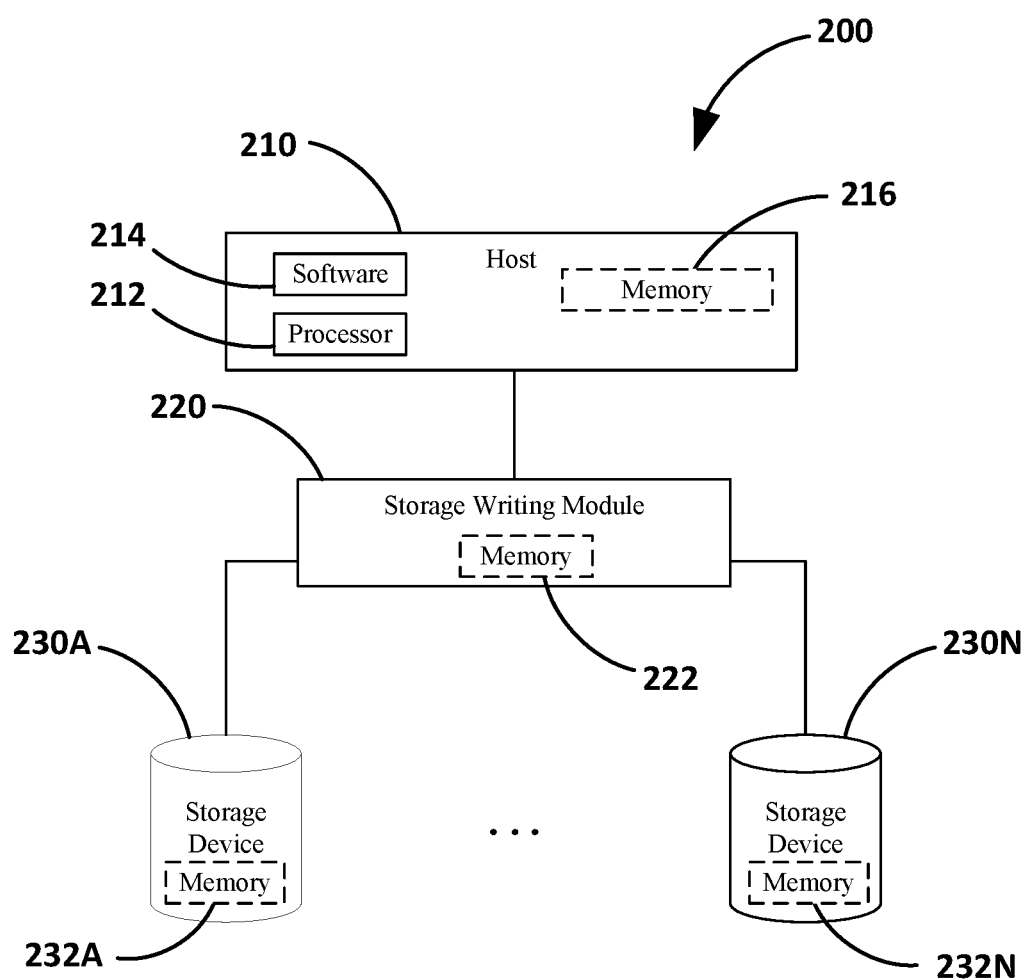
FIG. 2 is a schematic view of an example block storage device control system, arranged in accordance with at least some embodiments described herein.

FIG. 2 is a schematic view of an example block storage device control system 200, arranged in accordance with at least some embodiments described herein.

The system 200 may be arranged in accordance with at least some embodiments described herein. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof.

The system 200 includes host 210, a block storage writing module 220, and one or more storage devices 230A-230N. One or more of the storage devices 230A-230N may be block storage devices. The host 210 may direct data to be stored on the storage devices 230A-230N. The host 210 may access and/or retrieve the data on the storage devices 230A-230N.

Host device 210, in accordance with example embodiments described and recited herein, may be implemented as a controller, a processor (e.g., a CPU), or software on server 150 in FIG. 1 or on a central node in the block storage device control system 200; and may be communicatively connected to one or more of server 150 and/or the block storage writing module 220. In some example embodiments, the host 210 may correspond physically or communicatively with host 170 or with the server 150 of FIG. 1. In one example embodiment, the host 210 may correspond physically or communicatively with host 170 of FIG. 1, and the block storage writing module 220 may correspond with the server 150. In another example embodiment, host 210 may correspond with server 150, and the block storage writing module 220 may correspond physically or communicatively with a controller of the associated storage device(s) (e.g., a controller of storage devices 230A-230N), in software and/or a controller of host 170 in FIG. 1, and/or in firmware of the storage devices associated with the server 150. For example, the storage writing module 220 as shown in FIG. 2 may be incorporated into the host 210 (e.g., as software in the host 210) or may be incorporated into the storage device(s) 230A-230N (e.g., as a controller in the storage device(s) 230A-230N, as firmware of the storage device(s) 230A-230N).

In some embodiments, host device 210 may include processor 212 and one or more of software application 214 to operate, manipulate, read, write, delete, store, or otherwise access data on one or more of storage devices 230A-230N, via the storage writing module 220. When host device 170 is configured to write directly into the storage devices 230A-230N, the host device 170 may be incorporated into the host device 170 as software 214 as implemented by the software 212.

Storage writing module 220 are designed, programmed, or otherwise configured to perform storing (e.g., writing) of data in the storage devices 230A-230N. Storage writing module 220 may include and/or be implemented as software, firmware, application specific integrated circuits (ASICs), and/or field programmable gate arrays (FPGAs). In some embodiments, the storage writing module 220 can be also be designed, programmed, or otherwise configured to perform writing, deleting, storing, or otherwise accessing of the data stored on one or more of storage devices 230A-230N.

In accordance with some example embodiments described herein, one or more of the host 210, the block storage writing module 220, and/or the storage devices 230A-230N may include memory 216, 222, 232A-232N. Memory 216, 222, 232A-232N may include random access memory (RAM), such as for example, dynamic random access memory (DRAM), static random-access memory (SRAM), or the like. The memory/RAM can be configured to be used as a memory cache for one or more journals (e.g., journals 310, 320, 330 in FIGS. 3C-3D, journals 310, 330 in FIGS. 4A-4C, as discussed below) generated for each remainder in the storing of data records on the storage devices 230A-230N, as discussed below.

In an embodiment, memory 216, 222, 232A-232N can include a non-volatile memory, such as a hard disk drive HDD, a SSD, or the like. In one example embodiment, the non-volatile memory of memory 216, 222, 232A-232N may be for storing journals (e.g., journals 310, 320, 330 in FIGS. 3C-3D, journals 310, 330 in FIGS. 4A-4C, as discussed below) generated for remainders that occur in storing data on the storage devices 230A-230N. For example, a journal generated for a remainder in storing data on the storage devices 230A-230N may be stored (e.g., written) in one or more of the non-volatile memory and/or the memory cache of the memory 216, 222, 232A-232N of the host 210, the block storage writing module 220, and/or the storage devices 230A-230N.

In accordance with some example embodiments described herein, host device 210 is designed programmed, or otherwise configured to support big data analytics systems and/or, in combination, with business intelligence solutions that collect, process, scrub, and analyze big data, e.g., data mining, predictive analytics, real-time analytics, or the like. Therefore, host device 210 may include one or more software applications 214 to support a big data analytics system and may include one or more of application programming interface(s) (APIs), software development kit(s) (SDKs), one or more device drivers, one or more runtime library, one or more software plug-in, management tool, etc.

In an example embodiment, the operations of the block device writing module 220 may be transparent to the host 210. That is, the host 210 operates, manipulates, reads, writes, stores, or otherwise accesses data on the storage devices 230A-230N via the block device writing module 220. For example, when the host 210 writes data to the storage devices 230A-230N, the host 210 may send the data to the block storage writing module 220. For example, the host 210 may access and/or retrieve data stored on the storage devices 230A-230N via the block storage writing module 220. The block storage writing module 220 can control storage/writing of data on the storage devices 230A-230N.

In an example embodiment, the interface between the host 210 and the block storage writing module 220 and/or the interface between the storage devices 230A-230N and the block storage writing module 220 may be e.g., an interface that implements the non-volatile memory express (NVMe) storage access and transport protocol. It is to be understood that the features of the embodiments disclosed herein may be implemented in the block storage writing module 220. In an example embodiment, the block storage writing module 220 may include one or more components of a computer system 2000 (shown in FIG. 7, discussed below). In an example embodiment, the block device level compression module 220 may include the storage devices 230A-230N. In an example embodiment, the block storage writing module 220 may be in a form of a computer card or the like.

FIGS. 3A-3B are each a schematic view of an example storage space 300, arranged in accordance with at least some embodiments described herein. The storage space 300 is a storage space in a non-volatile memory. For example, the storage space 300 in an embodiment can be a storage space of the non-volatile memory of one or more storage devices 230A-230N in FIG. 2.

The storage space 300 is a blocked storage space in a block-level storage device (e.g., the one or more storage devices 230A-230N being a block-level storage device). FIGS. 3C-3D are schematic views illustrating an example of storing (e.g., writing) of data records into the block-level storage space 300.

In block-level storage devices, the block level storage space is zoned into a plurality of storage zones with a set size. Each storage zone contains a plurality of logic blocks with a set size (i.e., a set logic block size). The block-level storage space is zoned into a plurality of storage zones that each contain a plurality of logic blocks (LB). In one non-limiting example, a zone size may be 256 MB, and a logic block size may be 4 KB (e.g., each of the storage zones has a size of 256 MB, and the logic blocks each have a size of 4 KB). It should be appreciated that zone size and logic block size are not particularly limited and may be different sizes than 256 MB and 4 KB in other embodiments. For example, the zone size in other embodiments may be, but is not limited to, 1024 MB, 512 MB, 128 MB, 64 MB, or the like. For example, the logic block size in other embodiments may be, but is not limited to 4 KB, 8 KB, 16 KB, 32 KB, or the like. In the illustrated embodiment of FIGS. 3A-3E, the zone size is 256 MB.

FIG. 3A is a schematic view of storage zones $Z_{D1}$-$Z_{JM}$ in the example storage space 300, according to an embodiment. The storage space 300 includes the storage zones $Z_{D1}$-$Z_{JM}$. For example, the storage zones $Z_{D1}$-$Z_{JM}$ in FIG. 3A are a group storage zones that are physically adjacent to each other in the storage space 300. The storage zones $Z_{D1}$-$Z_{JM}$ include data storage zones $Z_{D1}$-$Z_{DN}$ (e.g., N number of data storage zones) and journal storage zones $Z_{J1}$-$Z_{JM}$ (e.g., M number of journal storage zones).

In an exemplary embodiment, the storage space 300 is the storage space in hard disk drive (HDD). In a HDD, the storage zones are arranged in parallel tracks. A storage space 300 may be split into data storage zones (e.g., data storage zones $Z_{D1}$-$Z_{DN}$) and journal storage zones (journal storage zones $Z_{J1}$-$Z_{JM}$). The group of storage zones $Z_{D1}$-$Z_{JM}$ in FIG. 3A corresponds with storage zones that physically adjacent by being in neighboring tracks. The storage zones are utilized so that at least one journal storage zone is allocated for each data storage zone. For example, the ratio of data storage zones to journal storage zones (N:M) can adjusted to optimize for data seeking or journal seeking. For example, in one example embodiment, when they have the same number of open zones, an inner track in the HDD (e.g., closer to the center of the magnetic disk) has a smaller ratio of data storage zones to journal storage zones than to a more outer located track. While the journal storage zone has been described herein as corresponding to the storage zone, such disclosure is not intended to be limiting. Rather, the journal storage zone may be used to support one or more storage zones, e.g., one or more open zones, or the like.

In the illustrated embodiment, the storage zones $Z_{D1}$-$Z_{JM}$ are each an append-only storage zone. In an append-only storage zone, overwriting is not allowed within the zone. For example, data is written sequentially to the logic blocks of an append-only storage zone, such that writing in the zone is continuous and cannot overwrite data within the zone. For example, the sequential writing in an append-only storage starts at the sequentially first logic block in the storage zone, occurs continuously within the storage zone, and ends at the sequentially last logic block in the storage writing. When retaining of the data in an append-only storage zone is no longer desired, the append-only storage zone can be reset (e.g., indicated as empty by the storage writing module 220 in FIG. 2), which can allow new data to be sequentially written into append-only storage zone.

In one example embodiment, zones in the storage space can each be in a free zone state, an open zone state, or a full zone state. A zone in a free state contain logical blocks that are unwritten (e.g., the zone does not contain data) and are not allowed to be written in. A zone in an open state can be written into in an append-only manner. For example, the zones can be opened by a controller managing the storage space (e.g., a controller of the block-level storage device 230A-230N in FIG. 2, by the associated storage writing module 220, by the associated host 270 in FIG. 2, a controller of the servers 150A-150N in FIG. 1, a controller of the host device 170 in FIG. 1). Free state zones can be opened (i.e., converted to an open state zone) to ensure that each open data storage zone is provided with a corresponding open journal storage zone. A zone in a full state is fully written, and cannot be written in again. A journal storage zone may be reset and re-opened as an open data storage zone. For example, a journal storage zone may be considered for reset once the journal storage zone reaches a full state. In one example embodiment, a controller of the storage space may be configured to reset a journal storage zone after all of the remainders contained in said journal storage zone have been written into a data storage zone. For example, this allows for the all of the zones in the storage space to eventually be a full zone.

FIG. 3B is a schematic view of a first storage zone $Z_1$ and a second storage zone $Z_2$ in the block-level storage space 300, in accordance with at least some embodiments as described herein. The first storage zone $Z_1$ in FIG. 3B corresponds with the first data zone $Z_{D1}$ in FIG. 3A, and the second storage zone $Z_2$ in FIG. 3B corresponds with the first journal data zone $D_{J1}$ in FIG. 3A.

As shown in FIG. 3B, the first storage zone $Z_1$ includes a plurality of logic blocks $LB_{A1-AN}$, and the second storage zone $Z_2$ includes a plurality of logic blocks $LB_{A2}$. The logic blocks $LB_{A1-AN}$, $LB_{B1-BN}$ have a set logic block size as discussed above. For example, the first storage zone $Z_1$ may be a data storage zone, and the second storage zone may be a journal storage zone for storing journals generated in writing to the first storage zone $Z_1$.

It should be appreciated that numerical terms used herein with respect to zones, logic blocks, writes, and data records (e.g., "first", "second", "third", or the like) should not be interpreted as a limiting to a specific positon or timing, unless specified otherwise. For example, numerical terms with respect to zones and logic blocks should not interpreted as limiting to a specific positon of a zone in the storage space, or to a position of a logic block within a zone. For example, a "first zone" may not be the initial zone in the storage space (e.g., may be a zone in a middle portion of the storage space). For example, "first logic blocks" (or a "first logic block") in a zone may not be the initial logic blocks (or initial logic block) in the zone (e.g., may be logic blocks disposed in a middle portion of the zone). For example, "first write" may not be the earliest/initial write in a storage zone. For example, "first data record" may not be the earliest/initial data record being stored in a storage zone. According to some embodiments, a "first write" can occur earlier (i.e., prior to) a "second write"; and a "second write" can occur earlier (i.e., prior to) a "third write".

FIGS. 3C-3E illustrate an example embodiment for storing three data records in the storage space 300. In the illustrated example of FIGS. 3C-3E, the set logic block size is 4K (e.g., each of the logic blocks $LB_{A1-AN}$, $LB_{B1-BN}$ have size of 4K). In the illustrated embodiment, the first storage zone $Z_1$ is a data storage zone in which data record is to be stored, and the second storage zone $Z_2$ is a journal storage zone for storing journals, as discussed below. For example, a journal storage zone is configured to be an intermediate storage for data as discussed below.

FIG. 3C shows an example of the storage space 300 after a (first) write for a first data record. FIG. 3D shows an example of the storage space after a (second) write for a second data record is performed (e.g., after writes for the first data record and the second data record are performed). FIG. 3E shows an example of the storage space after a third write for a third data record is performed (e.g., after the writes for the first data record, the second data record, and the third data record are performed). Different data is indicated in FIGS. 3C-3E with different hatching patterns. For example, a first type of hatching pattern indicates the stored data of the first data record, a second type of hatching indicates the stored data of the second data record, etc.

In the exemplary embodiment of FIGS. 3C-3E, the first data record has a size of 9K, the second data record has a size of 9K, and the third data record has a size of 9k. The size of a data record refers to the size of the data record as stored in the storage space 300.

In an embodiment, the three data records are received in different record IOs received by the controller of the storage space 300 (e.g., a controller of the block-level storage device 230A-230N in FIG. 2, by the associated storage writing module 220, by a controller of the associated host 270 in FIG. 2, a controller of the servers 150A-150N in FIG. 1, a controller of the host device 170 in FIG. 1). The first data record, the second data record, and the third data record may correspond with separate data write requests. In one example, the first data record corresponds with a first record IO received by the controller of the storage space 300, the second data record corresponds with a second record IO received by the controller of the storage space, and the third data record corresponds with a third record IO received by the controller of the storage space.

When writing in an append-only data storage zone (e.g., data storage zone $Z_1$), data is sequentially written to fill one or more logic blocks. This results in the logic block(s) being full (i.e., full of data without padding), which is referred to as an aligned write or as being logic block aligned. In the illustrated example, the first data record has a size (9 KB) that is larger than the logic block size (4K). Data for the first data record is sequentially written to fully fill the sequential logic blocks (e.g., a number of logic blocks for an aligned write), which is two logic blocks $LB_{A1}$, $LB_{A2}$. In the illustrated embodiment, the logic blocks are two sequential logic blocks $LB_{A1}$, $LB_{A2}$ in the data storage zone $Z_1$. In some embodiments, the data written into a logic block can include metadata In an embodiment, the metadata may include an identifier corresponding with the original data record (e.g., identifies the data in each logic block $LB_{A1}$, $LB_{A2}$ as being part of the same data record and/or as belong together).

A data record can include a main portion and a remainder portion. The data/portion of the data record initially written into a data storage zone can be referred to as the main portion, and the remainder portion is the portion of the data record that has not been written (e.g., the data/portion not contained in the main portion). In other examples, storing of an entire data record may result in full logic blocks; such that the data record does not have a remainder. In other examples, storing of a data record may result no full blocks; such that the entire data record is a remainder.

For example, the data/portion of the first data record written in the logic blocks $LB_{A1}$, $LB_{A2}$ is the main portion 302A of the first data record, and the other data/portion of the first data record not written into the data storage zone $Z_1$ is the remainder portion of the first data record (e.g., remainder 302B as discussed below). In the illustrated example, the main portion 302A is 8 KB (i.e., 2×4 KB logic blocks) and the remainder portion 302B is 1 KB (i.e., 9 KB of the first data record-8 KB of the main portion 302A). The logic blocks $LB_{A1}$, $LB_{A2}$ filled using the main portion 302A of the first record may also be referred to as first logic blocks. The remainder portion 302B of the first data record may also be referred to as a remainder (e.g., a remainder of the first data record), a first remainder, or a first remainder portion.

It should be appreciated that the term "main portion" as used herein is in reference to a portion of a data record that is stored first in a data storage zone, and not with reference to a size, important, etc. of the portion. For example, main portion 302A is stored in the data storage zone $Z_1$ before the remainder 302A. In some examples, the main portion of a data record may have a size that is smaller than the remainder portion.

A journal is generated for each data record remainder that occurs (e.g., when a portion of the data is not written into the logic block(s) to prevent non-alignment, a portion of the data not written to the first data zone $Z_1$ to prevent having a non-full logic block, when the remainder 310B occurs). The journal can include the remainder of the data record and a journal entry. In the illustrated example, a first journal 310 is generated for the first data record, and the first journal 310 includes the remainder 302B of the first data record and a first journal entry 312. In some embodiments, a journal may be generated by writing the components of the journal into the same logic block (e.g., writing the remainder 302B, the first journal entry 312, and padding 314 in the logic block $LB_{B1}$).

A remainder that has not yet been written into the data storage zone (e.g., is written in the journal storage zone but has not yet been copied/written into the data storage zone) may be referred to as an outstanding remainder. For example, in FIG. 3C, the first remainder 302B is an outstanding remainder as the data of the first remainder 302B has not yet been written into the data storage zone $Z_1$.

A journal entry in a journal can identify the remainder portion. For example, the journal entry may be or include metadata for the remainder. In some embodiments, the journal entry can identify a location of the corresponding main portion, identify the corresponding data record, a logic block after its corresponding main portion (or as a logic block in which the remainder is to be written), a cyclic redundancy code (CRC), or the like. For example, the first journal entry 312 may include a location of the main portion 302A (e.g., a location of the first logic blocks 302A in the storage space 300), an identifier for the first data record, an identifier of logic block $LB_{A2}$ as a last filled logic block, or the like.

As shown in FIG. 3C, the first journal 310 is stored in the journal storage zone $Z_2$ of the storage space 300. In particular, the first journal is written to a logic block $LB_{B1}$ in the journal storage zone $Z_2$. The first journal 310 may include padding 314 so that the first journal 310 is logic block aligned (e.g., padding 314 added so that the size of the first journal 310 is the same as the logic block size). In some examples, a journal may not include padding when the journal is already at the logic block size (e.g., a combined size of the remainder 302B and the journal entry 312 is equal to the logic block size).

In preparing to store another data record in the storage zone, the journal storage zone is scanned/reviewed to determine whether an outstanding remainder exists. For example, in preparing to store the second data record in the storage zone 300, the first journal 310 in the journal storage zone $Z_2$ may be read to determine that the remainder 302B is an outstanding remainder. In some embodiments, the journal entry 312 of the journal 310 is used to determine that the first remainder 302B corresponds with the data in the last full logic block in the data storage zone $Z_1$ (e.g., journal entry 312 indicates the remainder 302B and the last full logic block $LB_{A2}$ correspond to the same data record, the journal entry 312 indicates the logic block $LB_{A3}$ as a target logic block for storing the remainder, or the like).

Data of the outstanding remainder (e.g., of remainder 302B) and the second data record are sequentially written to the data storage space to fully fill the sequential logic blocks (e.g., a number of logic blocks for an aligned write). In one example embodiment, the data of the outstanding (first) remainder 302B and the second data record may be aggregated, and the aggregated data may be written to the data storage space.

FIG. 3D shows an example of the storage space 300 after the second data record is written to the storage space 300. In the illustrated example, the outstanding remainder 302B and the second data record fill two logic blocks $LB_{A3}$, $LB_{A4}$ in the data storage zone $Z_1$. In the illustrated embodiment, the filled logic blocks are two sequential logic blocks $LB_{A3}$, $LB_{A4}$ in the data storage zone $Z_1$. The two logic blocks $LB_{A3}$, $LB_{A4}$ are sequential to the logic blocks $LB_{A1}$, $LB_{A2}$ of the first/previous write in the data storage zone $Z_1$ (e.g., the logic blocks containing the main portion 302A of the first data record). "302" in FIG. 3D indicates the first data record as stored in the data storage zone $Z_1$. For example, the remainder 302B and the main portion 302A of the first data record are written/stored in sequential logic blocks $LB_{A1}$, $LB_{A2}$, $LB_{A3}$. The first data record 302 may be stored continuously in the sequential logic blocks $LB_{A1}$, $LB_{A2}$, $LB_{A3}$.

Main portion 304A is the portion of second data record stored/written in the logic blocks $LB_{A3}$, $LB_{A4}$ (e.g., with the remainder 302B of the first record). A remainder portion 304B of the second data record is the other data/portion of the second data record not written into the data storage zone $Z_1$. In the illustrated example, the main portion 304A of the second data record is 7 KB (i.e., 2×4 KB logic blocks-1 KB of the remainder 302B of the first data record 302), and the remainder portion 304B of the second data record is 2 KB (i.e., 9 KB of the second data record-7 KB of the main portion 304A). The logic blocks $LB_{A3}$, $LB_{A4}$ filled using the main portion 304A of the second record may be referred to as second logic blocks. The remainder portion 304B of the second data record may also be referred to as a remainder (e.g., a remainder of the second data record), a second remainder, or a second remainder portion.

A journal is generated for the remainder of the second data record. In the illustrated example, a second journal 320 is generated for the second remainder 304B. The second journal 320 includes the remainder 304B of the second data record and a (second) journal entry 322. For example, in FIG. 3D, the second remainder 304B is an outstanding remainder as the data of the second remainder 304B has not yet been written into the data storage zone $Z_1$. In FIG. 3D, the first remainder 302B is no longer an outstanding remainder as the data of the first remainder 302B is stored/written in the data storage zone $Z_1$.

The second journal entry can identify the second remainder. In an example embodiment, the second journal entry 322 may include one or more of a location of the main portion 304A of the second data record (e.g., location(s) of the second logic blocks $LB_{A3}$, $LB_{A4}$ in the storage space 300), an identifier for the second data record, an identifier of logic block $LB_{A2}$ as the last filled logic block, or the like.

As shown in FIG. 3D, the second journal 320 is stored in the journal storage zone $Z_2$ of the storage space 300. In particular, the second journal is written to a logic block $LB_{B2}$ in the journal storage zone $Z_2$. The second journal 320 may include padding 324 so that the second journal 320 is logic block aligned (e.g., padding 324 added so that the size of the second journal 320 matches the logic block size), as similarly discussed above with respect to the first journal 310.

In preparing to store the third data record in the storage space 300, the journal storage zone $Z_2$ can be scanned/reviewed to determine whether an outstanding remainder exists. For example, the second journal 320 in the journal storage zone $Z_2$ may be read to determine that the second remainder 304B is an outstanding remainder. In some embodiments, the journal entry 322 can be used to determine that the remainder 304B corresponds with the data in the last full logic block in the data storage zone $Z_1$ (e.g., journal entry 322 indicates the second remainder 304B and the last full logic block $LB_{A4}$ correspond to the same data record, the journal entry 322 indicates the logic block $LB_{A5}$ as a target logic block for storing the second remainder 304B, or the like).

Data of the outstanding remainder (e.g., of the second remainder 304B) and the third data record are sequentially written to the data storage space to fully fill the sequential logic blocks (e.g., a number of logic blocks for an aligned write). In one example embodiment, the data of the outstanding (second) remainder 304B and the third data record may be aggregated, and the aggregated data may be written to the data storage space.

FIG. 3E shows an example of the storage space 300 after the third data record is written to the storage space 300. In the illustrated example, the outstanding (second) remainder 304B and the third data record fill two logic blocks $LB_{A5}$, $LB_{A6}$ in the data storage zone $Z_1$. In the illustrated embodiment, the filled logic blocks are two sequential logic blocks $LB_{A5}$, $LB_{A6}$ in the data storage zone $Z_1$. The two logic blocks $LB_{A5}$, $LB_{A6}$ are sequential to the logic blocks $LB_{A3}$, $LB_{A4}$ of the second/previous write in the data storage zone $Z_1$ (e.g., the logic blocks containing the main portion 304A of the second data record). "304" in FIG. 3E indicates the second data record as stored in the data storage zone $Z_1$. For example, the remainder 304B and the main portion 304A of the second data record are written/stored in sequential logic blocks $LB_{A3}$, $LB_{A4}$, $LB_{A5}$. The second data record 304 may be stored continuously in the sequential logic blocks $LB_{A3}$, $LB_{A4}$, $LB_{A5}$.

Main portion 306A is the portion of third data record stored/written in the logic blocks $LB_{A5}$, $LB_{A6}$ (e.g., with the (second) remainder 304B of the second record). A (third) remainder 304B of the second data record is the other data/portion of the third data record not written into the data storage zone $Z_1$. In the illustrated example, the main portion 306A of the third data record is 6 KB (i.e., 2×4 KB logic blocks-2 KB of the second remainder 306B), and the remainder portion 306B of the third data record is 2 KB (i.e., 9 KB of the third data record-6 KB of the main portion 306A). The logic blocks $LB_{A5}$, $LB_{A6}$ filled using the main portion 306A of the third data record may also be referred to as third logic blocks. The remainder portion 306B of the third data record may also be referred to as a remainder (e.g., a remainder of the third data record), a third remainder, or a third remainder portion.

A journal is generated for the remainder of the third data record. In the illustrated example, a (third) journal 330 is generated for the third remainder 306B. The third journal 330 includes the third remainder 306B and a (third) journal entry 332. For example, in FIG. 3E, the third remainder 306B is an outstanding remainder as the data of the third remainder 306B has not yet been written into the data storage zone $Z_1$. In FIG. 3E, the first remainder 302B and the second remainder 304B are no longer outstanding remainders as the data of the first and second remainders 302B, 304B is stored/written in the data storage zone $Z_1$.

The third journal entry can identify the third remainder. In an example embodiment, the third journal entry 332 may include one or more of a location of the main portion 306A of the third data record (e.g., location(s) of the third logic blocks $LB_{A5}$, $LB_{A6}$ in the storage space 300), an identifier for the third data record, an identifier of logic block $LB_{A6}$ as the last filled logic block, or the like.

As shown in FIG. 3E, the third journal 330 is stored in the journal storage zone $Z_2$ of the storage space 300. In particular, the third journal is written to a logic block $LB_{B3}$ in the journal storage zone $Z_2$. The third journal 330 may include padding 334 so that the third journal 330 is logic block aligned (e.g., padding 334 added so that the size of the third journal 330 matches the logic block size), as similarly discussed above with respect to the first journal 310.

In some example embodiments, journals for the remainders may additionally or alternatively be stored in a memory cache. For example, journal(s) may be stored in a memory cache of the block storage device (e.g., cache of memory 323A, cache of memory 323B in FIG. 2), in a memory cache of an associated storage writing module (e.g., cache of memory 222), in a memory cache of a host associated with the block storage device (e.g., cache of memory 216), or the like. The latest journal being in the memory cache may be used to reduce reading of the storage space, which can reduce the read/write times to the storage space. The journals stored in the storage space may be used for crash recovery. For example, journal entries in a journal storage zone may be used to patch the corresponding data storage zone. When a cash occurs, journal entries stored in a journal storage zone can be used to patch the corresponding data storage zone (e.g., journal entries 312 in the journal storage zone $Z_2$ used to patch the data storage zone $Z_1$). In an embodiment, the journal entries stored in the data storage zone may include sequential numbering to prevent confusion when the journal zone contains journals used in different versions of data stored in a data storage zone (e.g., journals for a data storage zone that has been reset and written in again).

FIGS. 4C-4C illustrate another example embodiment of storing three data records in a storage space 300'. The storage space 300' can have features similar to those discussed for the storage zone 300 in FIGS. 3A-3E. For example, the storage space 300' includes a first storage zone $Z_1$' that is a data storage zone and a second storage zone $Z_2$' that is a journal storage zone, as similarly discussed for the storage space 300 in FIGS. 3A-3E. Different types of data is indicated in FIGS. 4A-4C with different hatching patterns, similar to in FIGS. 3C-3E.

FIG. 4A shows an example of the storage space 300' after performing a (first) write for a first data record. FIG. 4B shows an example of the storage space 300' after performing a (second) write for a second data record (e.g., after writes for the first data record and the second data record). FIG. 4C shows an example of the storage space 300' after performing a (third) write for a third data record (e.g., after writes for the first data record, the second data record, and the third data record). In the exemplary embodiment of FIGS. 4A-4C, the first data record has a size of 3 KB, the second data record has a size of 5 KB, and the third data record has a size of 14 KB. The logic block size in the storage space 300' is 4 KB, similar to the storage space 300.

In preparing to store the first data record in the storage space 300', the journal storage zone $Z_2$' may be scanned/reviewed to determine whether an outstanding remainder exists. In this example, there is no outstanding remainder in the data storage zone $Z_1$' prior to the write for the first data record.

Data is sequentially written in the data storage space 300' to fully fill the sequential logic blocks (e.g., a number of logic blocks for an aligned write). In this example, the first data record has a size of 3K, which is not large enough to fill a single logic block (4 KB); and the entire first data record is a (first) remainder portion 302B'. The first write in this embodiment does not write in the data storage zone. The remainder portion 302B' of the first data record may also be referred to as a remainder (e.g., a remainder of the first data record), a first remainder, or a first remainder portion.

A journal is generated for the remainder of the first data record. In the illustrated example, a first journal 310' is generated for the remainder 302B' (i.e., for the entire first data record). The (first) journal 310' includes the first remainder 302B' and a (first) journal entry 312'. For example, in FIG. 4A, the first remainder 302B' is an outstanding remainder as the data of the first remainder 302B' has not yet been written in the data storage zone $Z_1$'.

The journal entry 312' may identify the first remainder 302B'. In an example embodiment, the journal entry 312' may include an identifier for the first data record, an identifier of $LB'_{A1}$ as a target storage logic block for the remainder 302B', or the like.

As shown in FIG. 4A, the journal 310' is stored in the journal storage zone $Z_2$' of the storage space 300. In particular, the second journal is stored/written in a logic block $LB_{B2}$ of the journal storage zone $Z_2$'. The first journal 310' may include padding 314' so that the first journal 310' is logic block aligned (e.g., padding 314' added so that the size of the first journal 310' matches the logic block size).

In preparing to store the second data record in the storage zone 300', the journal storage zone 300' can be scanned/reviewed to determine whether an outstanding remainder exists. For example, in preparing to store the second data record in the storage zone 300', the first journal 310' in the journal storage zone $Z_2$' may be read to determine that the first remainder 302B' is an outstanding remainder. In some embodiments, the journal entry 312' of the journal 310' is used to determine that the first remainder 302B' does not corresponds with data in the last full logic block in the data storage zone $Z_1$' (e.g., journal entry 312' indicates the remainder 302B' and a last full logic block (not shown) correspond to different data records, journal entry 312' indicates the remainder 302B' is the entire data record, or the like).

Data of the outstanding remainder (e.g., of first remainder 302B') and the second data record are sequentially written to the data storage space to fully fill the sequential logic blocks (e.g., a number of logic blocks for an aligned write). In one example embodiment, the data of the outstanding (first) remainder 302B' and the second data record may be aggregated, and the aggregated data may be written to the data storage space.

FIG. 4B shows an example of the storage space 300' after the second data record is written to the storage space 300'. In the illustrated example, the outstanding (first) remainder 302B' and the second data record fill two logic blocks $LB'_{A1}$, $LB'_{A2}$ in the data storage zone $Z_1$'. In the illustrated embodiment, the filled logic blocks are two sequential logic blocks $LB'_{A1}$, $LB'_{A2}$ in the data storage zone $Z_1$'.

A main portion of the second data record stored/written in the logic blocks $LB'_{A1}$, $LB'_{A2}$ (e.g., with the remainder 302B' of the first record). Storing of the entire first data record and the entire second data record in results in two full logic blocks (i.e., 2×4 KB logic blocks=3 KB of the first data record+5 KB of the second data record). In this example, the entire second data record is stored in the filled logics blocks $LB'_{A1}$, $LB'_{A2}$, such that the second data record has no remainder; and the main portion of the (second) data record in this example is the entire second data record. "302" in FIGS. 4B and 4C indicates the first data record as stored in the data storage zone $Z_1$'. "304'" in FIGS. 4B and 4C indicates the second data record as stored in the data storage zone $Z_1$'. For example, the first data record 302' is written/stored in a single logic block $LB'_{A1}$. For example, the second data record is written/stored in sequential logic blocks $LB'_{A2}$, $LB'_{A2}$. The second data record 304' can be stored continuously in the sequential logic blocks $LB'_{A1}$, $LB'_{A2}$.

In this example, the second data record does not have a remainder. As there is no remainder, no journal is generated for the second data record. In FIG. 4B, the first remainder 302B' is no longer an outstanding remainder as the data of the first remainder 302B' is stored/written in the data storage zone $Z_1$.

In preparing to store the third data record in the storage space 300', the journal storage zone $Z_2$' can be scanned/reviewed to determine whether an outstanding remainder exists. For example, the first journal 310 in the journal storage zone $Z_2$' may be read to determine that there is no outstanding remainder. In some embodiments, the journal entry 312' of the first journal 310' can be used to determine that the last remainder 304B' does not correspond with the latest data record (e.g., the second data record) stored in the last full logic block in the data storage zone $Z_1$'.

As there is no outstanding remainder, just the third data record is sequentially written to the data storage space 300' to fully fill the sequential logic blocks (e.g., a number of logic blocks for an aligned write).

FIG. 4C shows an example of the storage space 300' after the third data record is written to the storage space 300'. In the illustrated example, the third data record fills three logic blocks $LB'_{A3}$, $LB'_{A4}$, $LB'_{A5}$ in the data storage zone $Z_1$'. In the illustrated embodiment, the filled logic blocks are three sequential logic blocks $LB'_{A3}$, $LB'_{A4}$, $LB'_{A5}$ in the data storage zone $Z_1$'. The three logic blocks $LB'_{A3}$, $LB'_{A4}$, $LB'_{A5}$ are sequential to the logic blocks $LB'_{A1}$, $LB'_{A2}$ of the second/previous write in the data storage zone $Z_1$' (e.g., the logic blocks containing the main portion 304A of the second data record).

Main portion 306A' is the portion of third data record stored/written in the logic blocks $LB'_{A3}$, $LB'_{A4}$, $LB'_{A5}$. A remainder portion 306B' of the third data record is the other data/portion of the third data record not written into the data storage zone $Z_1$'. In the illustrated example, the main portion 306A' of the third data record is 12 KB (i.e., 3×4 KB logic blocks), and the remainder portion 306B' of the third data record is 2 KB (i.e., 14 KB of the third data record-12 KB of the main portion 306A'). The logic blocks $LB'_{A3}$, $LB'_{A4}$, $LB'_{A5}$ filled using the main portion 306A of the third data record may also be referred to as third logic blocks. The remainder portion 306B' of the third data record may also be referred to as a remainder (e.g., a remainder of the third data record), a second remainder (e.g., second as there was no remainder for second data record), or a second remainder portion.

A journal is generated for the remainder of the third data record. In the illustrated example, a (third) journal 330' is generated for the third remainder 306B'. The third journal 330' includes the third remainder 306B' and a (third) journal entry 332'. For example, in FIG. 4C, the second remainder 306B' is an outstanding remainder as the data of the third remainder 306B' has not yet been written into the data storage zone $Z_1$'. In FIG. 4C, the first remainder 302B' is no longer an outstanding remainder as the data of the first remainders 302B' is stored/written in the data storage zone $Z_1$'.

The third journal entry can identify the third remainder. In an example embodiment, the third journal entry 332' may include one or more of a location of the main portion 306A' of the third data record (e.g., location(s) of the third logic blocks LB'$_{A3}$, LB'$_{A4}$, LB'$_{A5}$ in the storage space 300'), an identifier for the third data record, an identifier of logic block LB'$_{A5}$ as the last filled logic block, or the like.

As shown in FIG. 4C, the third journal 330' is stored in the journal storage zone Z$_2$' of the storage space 300'. In particular, the third journal 330' is written to a logic block LB'B$_3$ in the journal storage zone Z$_2$'. The third journal 330' may include padding 334' so that the third journal 330' is logic block aligned, as similarly discussed above with respect to the first journal 310'.

Figure 5:
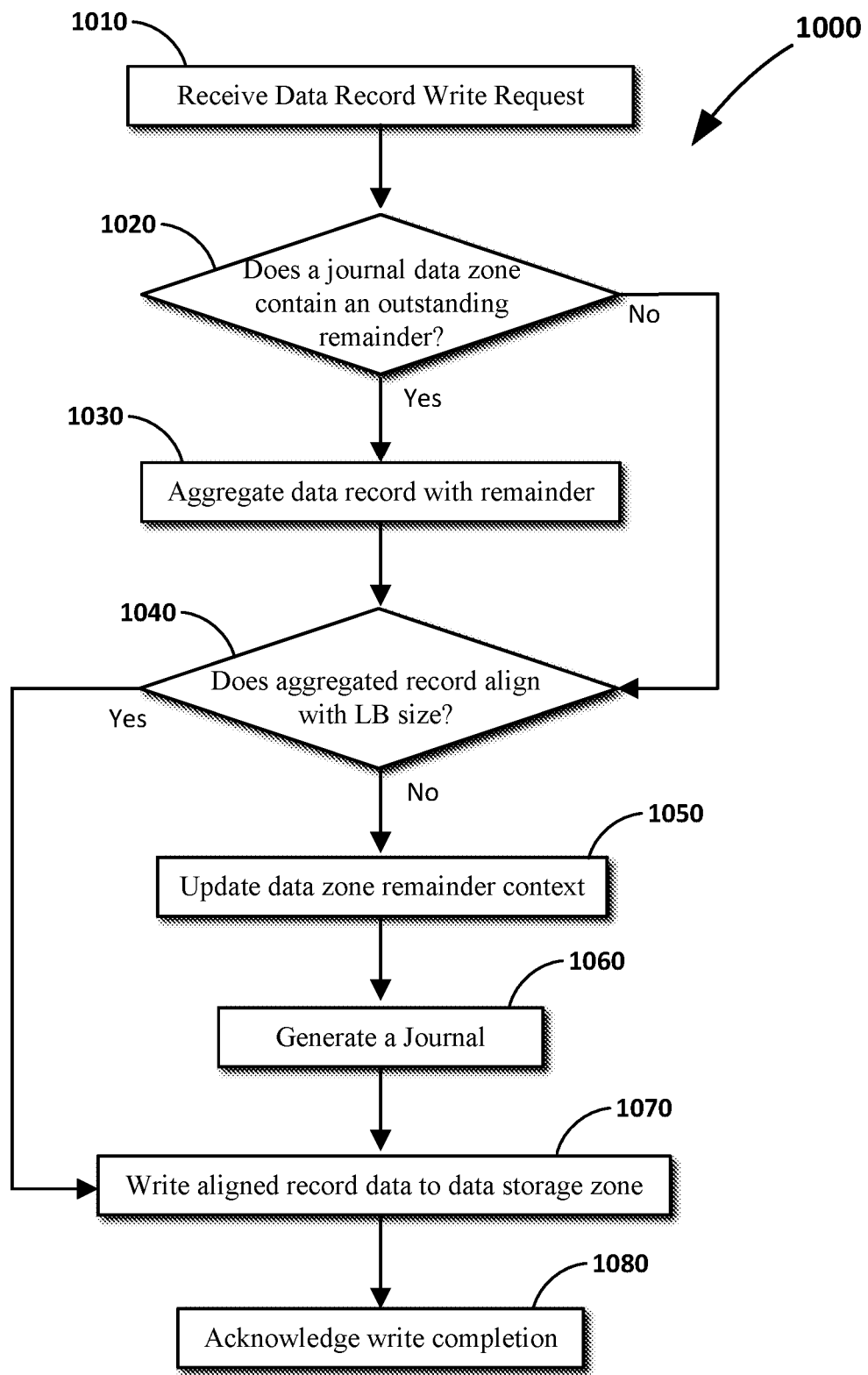
FIG. 5 is a block flow chart illustrating an embodiment of a write processing flow of aligned block storage writing using a journal

FIG. 5 is a flow chart illustrating an example write processing flow 1000 of aligned block storage writing using a journal, in accordance with at least some embodiments described herein.

Figure 7:
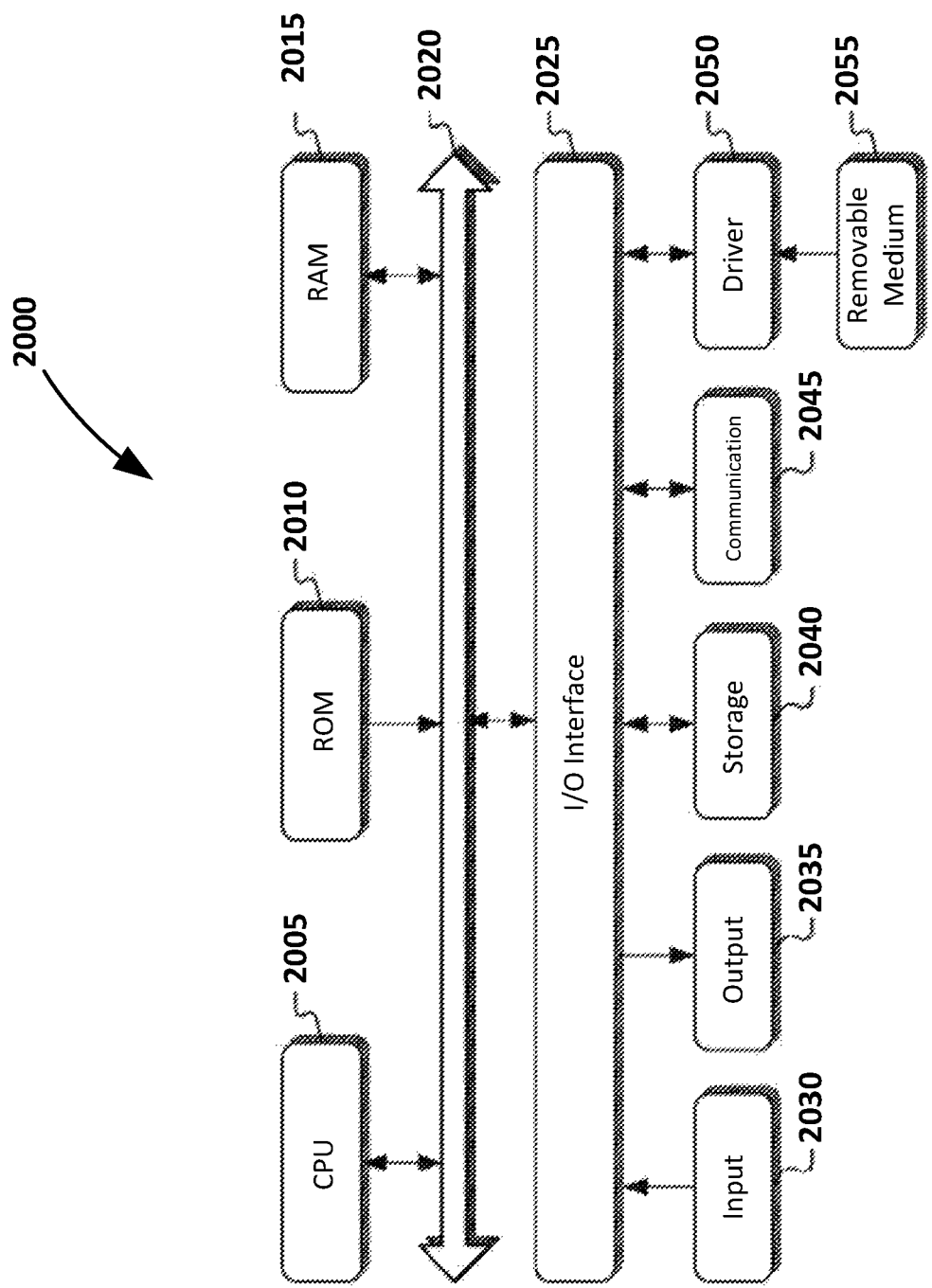
FIG. 7 is a schematic structural diagram of an embodiment of a computer system applicable to implementing an electronic device.

It is to be understood that the processing flow 1000 disclosed herein can be conducted by one or more processors (e.g., the processor of one or more of the terminal device 110, 120, 130, and 140 of FIG. 1, the processor of the server 150 of FIG. 1, the central processor unit 2005 of FIG. 7, a processor of the block device writing module 220 of FIG. 2, and/or any other suitable processor), unless otherwise specified.

It is also to be understood that the processing flow 1000 can include one or more operations, actions, or functions as illustrated by one or more of blocks 1010, 1020, 1030, 1040, 1050, 1060, 1070, and 1080. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 1000, operations including initializations or the like may be performed. For example, system parameters and/or application parameters may be initialized, one or more of the storage zone(s) may be reset, storage zones may be opened, open storage zones may be designated as an open data storage zones or an open journal storage zone, etc. Processing flow 1000 may begin at block 1010. It is also to be understood that the data to be written may be received from the host (e.g., the terminal device 110, 120, 130, and 140 of FIG. 1, the server 150 of FIG. 1, the host 210 of FIG. 2). The processing flow 1000 may be transparent to the host and/or the application (that requests the write process) that is run on the host.

At block 1010 (Receive Data Record Write Request), the processor may receive a data write request. For example, the processor receives a request to store data in one or more storage devices (e.g., a storage device of the server 150 in FIG. 1, a storage device of one of the storage devices 230A-230N). In one example, the data write request may be an internal request of the host (e.g., a request by an application of the host). In another example, the data write request may be an external request (e.g., a request from one of the terminal devices 110, 120, 130, and 140, a request by the server 150 in FIG. 1, a request from a different server, etc.) to store data in one or more of the storage device(s) associated with the host (e.g., storage devices 230A-230N in FIG. 2). The data write request can include the data to be stored.

At block 1020 (Detect for Outstanding Remainder), the processor may detect for an outstanding remainder. An outstanding remainder is a remainder portion that has not yet been stored/written into a data storage zone in the storage device(s) (e.g., remainder 302B in FIG. 3C, remainder 304B in FIG. 3D, remainder 306B in FIG. 3E, remainder 302A' in FIG. 4A, remainder 306B' in FIG. 4C). For example, a journal entry (e.g., journal entries 312, 322, 332 in FIGS. 4A-4C, journal entries 312', 332' in FIGS. 4A-4C) may be used (e.g., scanned, read, or the like) to determine whether there a stored remainder is outstanding. When an outstanding remainder is not detected, the process flow 1000 can proceed to 1040. When an outstanding remainder is detected, the process flow 1000 can proceed to block 1030.

At block 1030 (Aggregate Data Record with Outstanding Remainder), the processor may aggregate the data record and the outstanding remainder. This aggregate may be referred to as "aggregated data record". For example, aggregating a data record with the outstanding remainder may include determining a combined size of the data record and the outstanding remainder when stored in the storage zone (e.g., in the format of the data storage device, in a compressed state as stored in the data storage device, etc.). In some embodiments, aggregating of a data record with the outstanding remainder may include, for example but not limited to, storing the data record and the outstanding remainder in the same memory cache, combining the data of the data record with the data of the outstanding remainder, the like. The flow process 1000 can then proceed to block 1040.

At block 1040 (Determine Data Record Alignment), the processor may determine whether the aggregated data record would be logic block aligned as stored in the data storage device. As discussed above, a block storage device can have set logic block size. Data is aligned in a block storage device when the data as stored would fill an exact number of logic blocks (e.g., has a size as stored that is a multiple of the logic block size). For example, aggregated data record is not aligned when it would utilize padding in one or more logic blocks to fill all of the one or more logic blocks or would result in a remainder (e.g., a size of the aggregated record that is not a multiple of the logic block size). When the aggregated data record is logic block aligned, the process flow 1000 can proceed to 1070. When the aggregated data record is not logic block aligned, the process flow 1000 can proceed to block 1050.

At 1050 (Update Data Zone Remainder Context), the processor may update the context for a remainder of the aggregated data record. Updating the context for remainder can include determining data of the aggregated data record that is to be stored in the data storage zone (e.g., determining a main portion of the aggregated data record, the main portion 302A in FIG. 3C, the main portion 304A in FIG. 3D, the main portion 306A in FIG. 3E, or the main portion 306A in FIG. 4C).

At block 1060 (Generate a Journal), the process may generate a journal (e.g., journals 310 in FIGS. 3C-3E, journals 310', 330' in FIGS. 4A-4C) for the remainder. The journal can include a journal entry and the remainder. In some embodiments, a remainder may include, but is not limited to, a size of the remainder, a location in the data storage zone that the remainder will be stored, a location that the non-remainder portion of the aggregated data record (e.g., a main portion) will be stored in the data storage zone, context/information of previous remainders (e.g., cyclic redundancy checks (CNC) of previous remainders, locations of previous remainders, etc.), or the like. In an example embodiment, the generating of the journal can include storing (e.g., writing) the journal in a non-volatile memory associated with the storage device. In some embodiments, the journal may be stored in a journal memory zone in the same non-volatile memory as the aggregated data record (e.g., journal storage zone $Z_2'$ in FIGS. 3B-3E, journal storage zone $Z_2'$ in FIGS. 4A-4C). For example, the journal may be stored in a different non-volatile memory than the aggregated data record, such as, a host associated with the storage device (e.g., host 170 in FIG. 1, host 210 in FIG. 2), of an associated storage writing module (e.g., non-volatile memory of memory 222 in FIG. 2), a different non-volatile memory of the storage device, or the like. In some embodiments, the journal may be additionally or alternatively be stored in a memory cache associated with the storage device (e.g., memory cache of memory 232A-232N of the storage device 230A-232N, memory cache of memory 222 of storage writing module 220, memory cache 210 of associated host 210, etc.). The process flow 1000 can proceed to block 1070.

At 1070 (Write Aligned Data record to Data Zone), the processor may write aligned data record of the aggregated data record to the data storage zone in the storage device(s) (e.g., data storage zone $Z_1$ in FIGS. 3B-3E, data storage zone $Z_1'$ in FIGS. 4A-4C). For example, an aligned portion of the aggregated data record can include a portion of the data record and the outstanding remainder (e.g., the main portion 304A and remainder 304B in FIG. 3D, the main portion 306A and remainder 304B in FIG. 3E, the main portion 304A' and remainder 302B' in FIG. 4B, the main portion 306A' and remainder 304B' in FIG. 4C. The data in the aligned portion is logic block aligned (e.g., has a size when written in the data storage zone that is equal to a multiple of logic block size, has a size that results in no non-full blocks without padding). The process flow 1000 can proceed to block 1080.

At 1080 (Acknowledge Write Completion), the process may provide acknowledgment of completion of the data write request. The acknowledgment can be completion response to the data write request received at block 1080. In one example, the data write request may be an internal request of the host (e.g., an acknowledgment to an application of the host that sent the request). In another example, the data write request may be an external acknowledgment (e.g., an acknowledgment to one of the terminal devices 110, 120, 130, and 140 in FIG. 1, an acknowledgment to the server 150 in FIG. 1, a request from a different server, etc.) to store data in one or more of the storage device(s) associated with the host (e.g., storage devices 230A-230N in FIG. 2).

Figure 6:
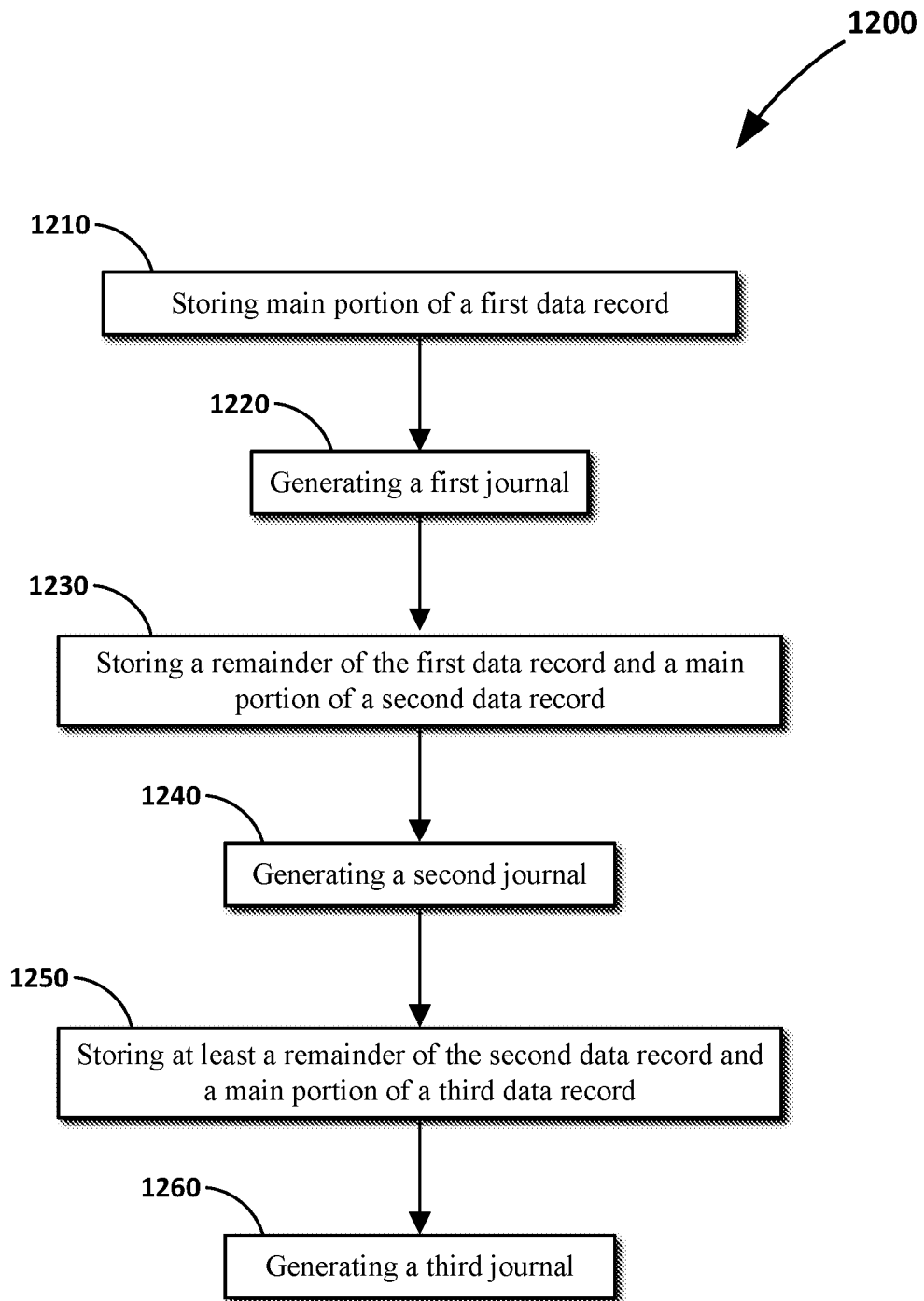
FIG. 6 is a flow chart illustrating an embodiment of a write processing flow of storing data in a non-volatile memory.

FIG. 6 is a flow chart illustrating another example write processing flow 1200 of storing data in a non-volatile memory, in accordance with at least some embodiments described herein. The process flow 1100 when employed can reduce or remove the use of padding in storing data in non-append data storage zone(s) of the non-volatile memory. In one example, the process flow 1200 can be used in shingled magnetic recording (SMR) to write/store data on SMR storage device (e.g., a HDD) with reduced/removed padding, such that the efficiency of the data storage on the HDD is improved relative to conventional SMR recording.

It is to be understood that the processing flow 1200 disclosed herein can be conducted by one or more processors (e.g., the processor of one or more of the terminal device 110, 120, 130, and 140 of FIG. 1, the processor of the server 150 of FIG. 1, the processor 212 of the host 201 in FIG. 2, a processor of the central processor unit 2005 of FIG. 7, a processor of the block device writing module 220 of FIG. 2, and/or any other suitable processor), unless otherwise specified.

It is to be understand that the processing flow 1200 can be conducted to store one or more data records in a non-volatile memory. In an embodiment, the non-volatile memory may be the non-volatile memory of one or more of the storage devices 230A-230N in FIG. 2. In an embodiment, the non-volatile memory may be the non-volatile memory of one or more of the servers 150A-150N or one of the terminal devices in FIG. 1.

It is also to be understood that the processing flow 1200 can include one or more operations, actions, or functions as illustrated by one or more of blocks 1210, 1220, 1230, 1240, 1250, and 1260. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 1200, operations including initializations or the like may be performed, as similarly discussed for the processing flow 1000 in FIG. 5. Processing flow 1200 may begin at block 1210. It is also to be understood that the data to be written may be received from the host (e.g., the terminal device 110, 120, 130, and 140 of FIG. 1, the server 150 of FIG. 1, the host 210 of FIG. 2). The processing flow 400 may be transparent to the host and/or the application (that requests the write process) that is run on the host.

At block 1210 (Storing main portion of first data record), the processor may store a main portion of a first data record in one or more first logic blocks. For example, the storing of the main portion of the first data record can include writing sequentially at least the main portion in an append-only storage zone (e.g., one of the data storage zones $Z_{D1}$-$Z_{DN}$ in FIG. 3A, in storage zone $Z_1$ in FIG. 3B). The main portion of the first data record may be sequentially written into one or more first logic blocks of the append-only storage zone. In some embodiments, there may be an outstanding remainder (e.g., in the corresponding journal(s) for the storage zone). In such embodiments, both the main portion of the first data record and the outstanding remainder may be sequentially written to the storage zone. The one or more first logic blocks are written full. For example, the main portion (or the main portion and the outstanding remainder, if present) are logic block aligned such that writing fills the one or more first logic blocks. In one example, the main portion may be at least twice as large as the logic block size of the storage zone, and the main portion is written into a plurality of the first logic blocks (e.g., main portion 306' in FIG. 4C stored in logic blocks $Z_{A3}$, $Z_{A3}$, $Z_{A4}$). The flow process 1200 can proceed to block 1220.

At block 1220 (Generating a first journal), the processor may generate a (first) journal that includes a remainder portion of the first data record and a journal entry. The journal entry corresponds with the remainder portion of the first data record. For example, the journal entry may contain information about the remainder, as discussed herein. In one example, the journal entry may include a storage location of the corresponding main portion in the data storage zone (e.g., identifier for the first logic block(s) in the storage zone), an identifier for the first data record, or the like. In an example embodiment, the generating of the journal entry may include writing of the journal in a journal storage zone.

In some embodiments, the writing of the entire first data record may result in full logic block(s) (e.g., the entire first data record being written into the logic block and being logic block aligned). When this occurs, there is no remainder and the block 1220 may be omitted.

In one example, the journal is written in a second append-only storage zone of the non-volatile storage and/or in a memory cache associated with the block-level storage device. For example, the journal may be written in the second append-only storage zone of the non-volatile storage and in the memory cache. The journal stored in the second append-only storage zone can be used in response to a failure/crash of the memory cache, while the journal stored in the memory cache can be relied upon to allow for writing of the remainder in the journal without reading from the non-volatile memory (e.g., allows for reduce reads when the non-volatile memory is a HDD). The process flow 1200 may then proceed to block 1230.

At block 1230 (Storing a remainder of the first data record and a main portion of a second data record), the processor may store the remainder of the first data record and a main portion of a second record in one or more first logic blocks. For example, the storing of the main portion of the first data record and the remainder of the first data record can include writing sequentially the main portion and the remainder portion in one or more logic blocks of the append-only storage zone (e.g., into one or more second logic blocks). The one or more second logic blocks are written full. For example, the main portion and the remainder in combination are logic block aligned such that writing fills the second logic block(s). The flow process 1200 can proceed to block 1240.

In an embodiment, the second storage zone may be reset after the remainder portion is stored in the first storage zone. For example, in such an embodiment, the rest may occur in response to the second storage zone being at or about full. This can allow for the second storage zone to be reused (e.g., written on), once the second storage zone is opened. The flow process 1200 can proceed to block 1240.

At block 1240 (Generating a second journal), the processor may generate a (second) journal that includes a remainder portion of the second data record and a journal entry. The journal entry corresponds with the remainder portion of the second data record. For example, the journal entry may contain information about the remainder, as discussed herein. In one example, the journal entry may include a storage location of the corresponding main portion in the data storage zone (e.g., identifier for the second logic block(s) in the storage zone), an identifier for the second data record, or the like. In an example embodiment, the generating of the journal entry may include writing of the journal in a journal storage zone.

In some embodiments, the writing of the entire second data record (by itself or in combination with the remainder of the first record when present) may result in full logic block(s) (e.g., the entire second data record being written in the second logic block(s) and being logic block aligned, or the entire second data record and the remainder portion of the first data record being written in the second logic blocks and being logic block aligned). When this occurs, there is no remainder and the block 1240 may be omitted.

In one example, the (second) journal can be written in the second append-only storage zone of the non-volatile storage and/or in the memory cache associated with the block-level storage device, as similarly discussed above with respect to the first journal. In some exemplary embodiments as described herein, the first journal may be written in a first logic block and the second journal may be written in a second logic block of the same storage zone (e.g., both journals stored in the second append-only storage zone of the non-volatile storage, both journals stored in the same append-only journal storage zone). The process flow 1200 may then proceed to block 1250.

At block 1250 (Storing a remainder of the second data record and a main portion of a third data record), the processor may store the remainder of the second data record and a main portion of a third record in one or more first logic blocks. For example, the storing of the main portion of the third data record and the remainder of the second data record can include writing sequentially the main portion and the remainder portion in one or more logic blocks of the append-only storage zone (e.g., into one or more third logic blocks). The one or more third logic blocks are written full. For example, the main portion and the remainder in combination are logic block aligned such that the writing fills the third logic block(s). The flow process 1200 can proceed to block 1260.

At block 1250 (Generating a third journal), the processor may generate a (third) journal that includes a remainder portion of the third data record and a journal entry. The journal entry corresponds with the remainder portion of the third data record. For example, the journal entry may contain information about the remainder, as discussed herein. In one example, the journal entry may include a storage location of the corresponding main portion in the data storage zone (e.g., identifier for the third logic block(s) in the storage zone), an identifier for the second data record, or the like. In an example embodiment, the generating of the journal entry may include writing of the journal in a journal storage zone.

In some embodiments, the writing of the entire third data record (by itself or in combination with the remainder of the second record when present) may result in full logic block(s) (e.g., the entire third data record being written in the third logic block(s) and being logic block aligned, or the entire third data record and the remainder portion of the second data record being written in the second logic block(s) and being logic block aligned). When this occurs, there is no remainder and the block 1260 may be omitted.

In one example, the (second) journal can be written in the second append-only storage zone of the non-volatile storage and/or in the memory cache associated with the block-level storage device, as similarly discussed above with respect to the first journal. In some exemplary embodiments as described herein, the first journal may be written in a first logic block, the second journal may be written in a second logic block, and the third journal may be written in a third logic block the same storage zone (e.g., both journals stored in the second append-only storage zone of the non-volatile storage, both journals stored in the same append-only journal storage zone). For example, the first logic block, the second logic block and third logic block can be consecutive logic blocks in the same storage zone.

It should be appreciated that the flow process 1200 in FIG. 6 may be modified with features as discussed herein. For example, the flow process 1200 may be modified to include features as described with respect to the storage space, the storage zones, and the storing/writing of data to the data storage zone(s) and the journal storage zone(s) in FIGS. 3A-4D. For example, the flow process 1200 may be modified to include features as described with respect to the flow process 1000 in FIG. 5.

FIG. 7 is a schematic structural diagram of an example computer system 2000 applicable to implementing an electronic device (e.g., one of the servers 150A-150N or one of the terminal devices 110, 120, 130, 140 shown in FIG. 1), arranged in accordance with at least some embodiments described herein. It is to be understood that the computer system shown in FIG. 7 is provided for illustration only instead of limiting the functions and applications of the embodiments described herein.

As depicted, the computer system 2000 may include a central processing unit (CPU) 2005. The CPU 2005 may perform various operations and processing based on programs stored in a read-only memory (ROM) 2010 or programs loaded from a storage device 2040 to a random-access memory (RAM) 2015. The RAM 2015 may also store various data and programs required for operations of the system 2000. The CPU 2005, the ROM 2010, and the RAM 2015 may be connected to each other via a bus 2220. An input/output (I/O) interface 2025 may also be connected to the bus 2220.

As shown in FIG. 7, the components connected to the I/O interface 2025 may further include an input device 2030, an output device 2035, an output device 2035, a storage device 2040, and/or a communication device 2045. The input device 2030 may include a keyboard, a mouse, a digital pen, a drawing pad, or the like. The output device 2035 may include a display (e.g., a liquid crystal display (LCD), a light-emitting diode (LED) display, an organic LED display, etc.), a speaker, or the like. The storage device 2040 may include a hard disk (e.g., an HDD, an SSD, etc.) or the like. In an embodiment, a driver 2050 may also be connected to the I/O interface 2025. The communication device 2045 can include a network interface card (e.g., a LAN card), a modem, or the like. The communication device 2045 may perform communication processing via a network such as the Internet, a WAN, a LAN, a LIN, a cloud, etc. A removable medium 2055 (e.g., a magnetic disk, an optical disk, a magneto-optical disk, a semiconductor memory, or the like) may be mounted on the driver 2050 as desired, such that a computer program read from the removable medium 2055 may be installed in the storage device 2040.

It is to be understood that the processes described with reference to the storage of data in the storage spaces in FIGS. 3C-3E, to the flowcharts of FIGS. 5 and 6, to the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 2045, and/or may be installed from the removable medium 2055. The computer program, when being executed by the central processing unit (CPU) 2005, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

Any of Aspects 1-12 can be combined with any of aspects 13-20, and any of Aspects 14-19 can be combined Aspect 20.

Aspects 1. A method of storing data in a non-volatile storage, comprising: writing sequentially at least a main portion of a first data record in one or more first logic blocks of a first append-only storage zone of the non-volatile storage until the one or more first logic blocks are written full; and generating a first journal including a remainder portion of the first data record and a journal entry for the remainder portion.

Aspect 2. The method of Aspect 1, wherein the journal entry includes a location of the one or more first logic blocks in the non-volatile storage.

Aspect 3. The method of any one of Aspects 1-2, wherein the first journal is generated by writing both the remainder portion of the first data record and the journal entry into a logic block of a second append-only storage zone of the non-volatile storage.

Aspect 4. The method of Aspect 3, wherein the non-volatile storage includes a plurality of adjacent append-only storage zones that includes a group of sequential append-only data storage zones and a group of sequential append-only journal storage zones, the group of sequential append-only data storage zones including the first append-only storage zone, and the group of sequential append-only journal storage zones including the second append-only storage zone.

Aspect 5. The method of any one of Aspects 1-4, wherein the first journal is stored in a memory cache.

Aspect 6. The method of any one of Aspects 1-5, wherein a size of the first data record is larger than a logic block size of the non-volatile storage, and the one or more first logic blocks is a plurality of sequential first logic blocks.

Aspect 7. The method of any one of Aspects 1-6, further comprising: writing sequentially the remainder portion of the first data record and a main portion of a second data record in one or more second logic blocks in the first append-only storage zone until the one or more second logic blocks are full; and generating a second journal including a remainder portion of the second data record and a journal entry for the remainder portion of the second data record.

Aspect 8. The method of Aspect 7, further comprising: writing the first journal in a first logic block of a second append-only storage zone of the non-volatile storage; and writing the second journal in a second logic block of the second append-only storage zone of the non-volatile storage.

Aspect 9. The method of Aspect 8, further comprising: resetting the second append-only storage zone, after the remainder portion of the first data record has been written in the first append-only storage zone.

Aspect 10. The method of Aspect 9, further comprising: opening the second append-only storage zone, after the resetting of the second append-only storage zone, wherein the second append-only storage zone is opened as a data storage zone in the non-volatile storage.

Aspect 11. The method of any one of Aspects 7-10, further comprising: writing sequential a remainder portion of the second data record and a main portion of a third data record in one or more third logic blocks in the first append-only storage zone until the one or more third logic blocks are written full; and generating a third journal including a remainder portion of the third data record and a journal entry for the remainder portion of the second data record.

Aspect 12. The method of Aspect 11, further comprising: writing the first journal in a first logic block of a second append-only storage zone of the non-volatile storage; writing the second journal in a second logic block of the second append-only storage zone of the non-volatile storage; and writing the third journal in a third logic block of the second append-only storage zone of the non-volatile storage, wherein the journal entry of the first journal, the journal entry of the second journal, and the journal entry of the third journal include sequential numbering.

Aspect 13. A storage device control system, comprising: a non-volatile storage; and a controller configured to: write sequentially at least a main portion of a first data record in one or more sequential first logic blocks of a first append-only storage zone of the non-volatile storage until the one or more sequential first logic blocks are written full, and generate a first journal including a remainder portion of the first data record and a journal entry for the remainder portion.

Aspect 14. The storage device control system of Aspect 13, wherein the non-volatile storage is configured to be a shingled magnetic recording block-storage device.

Aspect 15. The storage device control system of Aspect 14, wherein the controller is configured to: store the first journal in a memory cache of the controller.

Aspect 16. The storage device control system of any one of Aspects 13-15, wherein the controller is configured to: store the first journal in a second append-only storage zone of the non-volatile storage.

Aspect 17. The storage device control system of any one of Aspects 13-16, wherein the controller is configured to: write sequentially the remainder portion of the first data record and a main portion of a second data record in one or more second logic blocks in the first append-only storage zone until the one or more second logic blocks are written full, and generate a second journal including a remainder portion of the second data record and a journal entry for the remainder portion of the second data record.

Aspect 18. The storage device control system of Aspect 17, wherein the controller is configured to: write the first journal in a first logic block of a second append-only storage zone of the non-volatile storage, and write the second journal in a second logic block of the second append-only storage zone of the non-volatile storage, wherein the journal entry of the first journal and the journal entry of the second journal include sequential numbering.

Aspect 19. The storage device control system of any one of Aspects 17 and 18, wherein the first data record corresponds with a first record IO received by the controller, and the second data record corresponds with a second record IO received by the controller after the first record IO.

Aspect 20. A non-transitory computer-readable medium having computer-executable instructions stored thereon that, upon execution, cause one or more processors to perform operations comprising: writing sequentially at least a main portion of a first data record in one or more first logic blocks of a first append-only storage zone of a non-volatile storage until the one or more first logic blocks are written full; and generating a first journal including a remainder portion of the first data record and a journal entry for the remainder portion.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of storing data in a non-volatile storage, comprising:
   writing sequentially at least a main portion of a first data record in one or more first logic blocks of a first append-only storage zone of the non-volatile storage until the one or more first logic blocks are written full; and
   generating a first journal including a remainder portion of the first data record and a journal entry for the remainder portion, wherein the journal entry includes a location of the one or more first logic blocks in the non-volatile storage.

2. The method of claim 1, wherein the first journal is generated by writing both the remainder portion of the first data record and the journal entry into a logic block of a second append-only storage zone of the non-volatile storage.

3. The method of claim 2, wherein the non-volatile storage includes a plurality of adjacent append-only storage zones that includes a group of sequential append-only data storage zones and a group of sequential append-only journal storage zones, the group of sequential append-only data storage zones including the first append-only storage zone, and the group of sequential append-only journal storage zones including the second append-only storage zone.

4. The method of claim 1, wherein the first journal is stored in a memory cache.

5. The method of claim 1, wherein a size of the first data record is larger than a logic block size of the non-volatile storage, and the one or more first logic blocks comprise a plurality of sequential logic blocks.

6. The method of claim 1, further comprising:
   writing sequentially the remainder portion of the first data record and a main portion of a second data record in one or more second logic blocks in the first append-only storage zone until the one or more second logic blocks are full; and
   generating a second journal including a remainder portion of the second data record and a journal entry for the remainder portion of the second data record.

7. The method of claim 6, further comprising:
   writing the first journal in a logic block of a second append-only storage zone of the non-volatile storage; and
   writing the second journal in a second logic block of the second append-only storage zone of the non-volatile storage.

8. The method of claim 7, further comprising:
   resetting the second append-only storage zone, after the remainder portion of the first data record has been written in the first append-only storage zone.

9. The method of claim 8, further comprising:
   opening the second append-only storage zone, after the resetting of the second append-only storage zone, wherein the second append-only storage zone is opened as a data storage zone in the non-volatile storage.

10. The method of claim 6, further comprising:
    writing sequential a remainder portion of the second data record and a main portion of a third data record in one or more third logic blocks in the first append-only storage zone until the one or more third logic blocks are written full; and
    generating a third journal including a remainder portion of the third data record and a journal entry for the remainder portion of the second data record.

11. The method of claim 10, further comprising:
    writing the first journal in a logic block of a second append-only storage zone of the non-volatile storage;
    writing the second journal in a second logic block of the second append-only storage zone of the non-volatile storage; and
    writing the third journal in a third logic block of the second append-only storage zone of the non-volatile storage,
    wherein the journal entry of the first journal, the journal entry of the second journal, and the journal entry of the third journal include sequential numbering.

12. A storage device control system, comprising:
    a non-volatile storage; and
    a controller configured to:
      write sequentially at least a main portion of a first data record in one or more first logic blocks of a first append-only storage zone of the non-volatile storage until the one or more first logic blocks are written full, and
      generate a first journal including a remainder portion of the first data record and a journal entry for the remainder portion, wherein the journal entry includes a location of the one or more first logic blocks in the non-volatile storage.

13. The storage device control system of claim 12, wherein the non-volatile storage is configured to be a shingled magnetic recording block-storage device.

14. The storage device control system of claim 13, wherein the controller is configured to:
    store the first journal in a memory cache of the controller.

15. The storage device control system of claim 13, wherein the controller is configured to:
    store the first journal in a second append-only storage zone of the non-volatile storage.

16. The storage device control system of claim 13, wherein the controller is configured to:
    write sequentially the remainder portion of the first data record and a main portion of a second data record in one or more second logic blocks in the first append-only storage zone until the one or more second logic blocks are written full, and
    generate a second journal including a remainder portion of the second data record and a second journal entry for the remainder portion of the second data record.

17. The storage device control system of claim 16, wherein the controller is configured to:
- write the first journal in a first logic block of a second append-only storage zone of the non-volatile storage, and
- write the second journal in a second logic block of the second append-only storage zone of the non-volatile storage, wherein the journal entry of the first journal and the journal entry of the second journal include sequential numbering.

18. The storage device control system of claim 16, wherein the first data record corresponds with a first record IO received by the controller, and the second data record corresponds with a second record IO received by the controller after the first record IO.

19. A non-transitory computer-readable medium having computer-executable instructions stored thereon that, upon execution, cause one or more processors to perform operations comprising:
- writing sequentially at least a main portion of a first data record in one or more logic blocks of a first append-only storage zone of a non-volatile storage until the one or more first logic blocks are written full; and
- generating a first journal including a remainder portion of the first data record and a journal entry for the remainder portion, wherein the journal entry includes a location of the one or more first logic blocks in the non-volatile storage.

* * * * *

UNITED STATES PATENT AND TRADEMARK OFFICE
CERTIFICATE OF CORRECTION

PATENT NO. : 12,307,109 B2  
APPLICATION NO. : 18/476685  
DATED : May 20, 2025  
INVENTOR(S) : Peng Xu et al.

Page 1 of 1

It is certified that error appears in the above-identified patent and that said Letters Patent is hereby corrected as shown below:

On the Title Page

Item [73], after Lemon Inc., Grand Cayman (KY) Insert:
-- Beijing Volcano Engine Technology Co., Ltd., Beijing (CN) --, therefor.

Signed and Sealed this  
Sixteenth Day of September, 2025

Coke Morgan Stewart  
*Acting Director of the United States Patent and Trademark Office*